US012772158B2

(12) United States Patent
Lindheimer et al.

(10) Patent No.: US 12,772,158 B2
(45) Date of Patent: Oct. 20, 2026

(54) RADIO NETWORK NODE, USER EQUIPMENT, NETWORK NODE AND METHODS PERFORMED THEREIN

(71) Applicant: Telefonaktiebolaget LM Ericsson (publ), Stockholm (SE)

(72) Inventors: Christofer Lindheimer, Vadstena (SE); Mai-Anh Phan, Herzogenrath (DE); Oscar Ohlsson, Bromma (SE); Hernán Felipe Arraño Scharager, Täby (SE); Miguel Angel Garcia Martin, Madrid (ES); Peter Hedman, Helsingborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 408 days.

(21) Appl. No.: 18/557,927

(22) PCT Filed: Apr. 28, 2022

(86) PCT No.: PCT/SE2022/050409
§ 371 (c)(1),
(2) Date: Oct. 27, 2023

(87) PCT Pub. No.: WO2022/231505
PCT Pub. Date: Nov. 3, 2022

(65) Prior Publication Data

US 2024/0276359 A1 Aug. 15, 2024

Related U.S. Application Data

(60) Provisional application No. 63/180,679, filed on Apr. 28, 2021.

(51) Int. Cl.
*H04W 48/18* (2009.01)
*H04W 48/12* (2009.01)

(52) U.S. Cl.
CPC .......... *H04W 48/18* (2013.01); *H04W 48/12* (2013.01)

(58) Field of Classification Search
CPC .................................................. H04W 48/18
See application file for complete search history.

(56) References Cited

U.S. PATENT DOCUMENTS

2022/0240210 A1* 7/2022 Lai ........................ H04W 12/06
2023/0075285 A1* 3/2023 Jung ...................... H04W 48/18
2024/0224163 A1* 7/2024 Starsinic ............... H04W 48/12

FOREIGN PATENT DOCUMENTS

WO 2022203579 A1 9/2022
WO 2022211711 A1 10/2022
WO 2022211712 A1 10/2022

OTHER PUBLICATIONS

3GPP TS 23.501 V17.1.0 (Jun. 2021), 3rd Generation Partnership Project; Technical Specification Group Services and System Aspects; System architecture for the 5G System (5GS); Stage 2(, Release 17) (whole clause 5 . 30 .2).

(Continued)

*Primary Examiner* — Barry W Taylor
(74) *Attorney, Agent, or Firm* — Nicholson De Vos Webster & Elliott LLP

(57) ABSTRACT

A method performed by a radio network node for handling services in a wireless communications network. The radio network node receives, from a user equipment (UE), an indication indicating selection of a service associated with a service indication out of at least one service indication; and based on the received indication, selects a network node that supports the service indicated by the indication.

18 Claims, 19 Drawing Sheets

(56) References Cited

OTHER PUBLICATIONS

International Search Report and Written Opinion, Application No. PCT/SE2022/050409, Aug. 12, 2022, 15 pages.
3GPP TR 23.700-07 V1.2.0, "3rd Generation Partnership Project; Technical Specification Group Services and System Aspects; Study on enhanced support of non-public networks (Release 17)," Nov. 2020, 247 pages, 3GPP Organizational Partners.
3GPP TR 23.700-07 V2.0.0, "3rd Generation Partnership Project; Technical Specification Group Services and System Aspects; Study on enhanced support of non-public networks (Release 17)," Mar. 2021, 248 pages, 3GPP Organizational Partners.
3GPP TR 23.700-07 V17.0.0, "3rd Generation Partnership Project; Technical Specification Group Services and System Aspects; Study on enhanced support of Non-Public Networks (NPN) (Release 17)," Mar. 2021, 248 pages, 3GPP Organizational Partners.
3GPP TS 23.003 V17.0.0, "3rd Generation Partnership Project; Technical Specification Group Core Network and Terminals; Numbering, addressing and identification; (Release 17)," Dec. 2020, 142 pages, 3GPP Organizational Partners.
3GPP TS 23.501 V16.7.0, "3rd Generation Partnership Project; Technical Specification Group Services and System Aspects; System architecture for the 5G System (5GS); Stage 2 (Release 16)," Dec. 2020, 450 pages, 3GPP Organizational Partners.
3GPP TS 38.300 V16.4.0, "3rd Generation Partnership Project; Technical Specification Group Radio Access Network; NR; NR and NG-RAN Overall Description; Stage 2 (Release 16)," Dec. 2020, 149 pages, 3GPP Organizational Partners.
3GPP TS 38.331 V16.3.1, "3rd Generation Partnership Project; Technical Specification Group Radio Access Network; NR; Radio Resource Control (RRC) protocol specification (Release 16)," Jan. 2021, 932 pages, 3GPP Organizational Partners.
3GPP TS 38.401 V16.4.0, "3rd Generation Partnership Project; Technical Specification Group Radio Access Network; NG-RAN; Architecture description (Release 16)," Jan. 2021, 78 pages, 3GPP Organizational Partners.
Intel, "Summary for UE onboarding and provisioning for NPN," Apr. 12-20, 2021, 7 pages, 3GPP TSG-RAN WG2 #113bis-e, R2-2104492, Electronic meeting.
International Preliminary Report on Patentability, Application No. PCT/SE2022/050409, Nov. 9, 2023, 13 pages.

* cited by examiner

RADIO NETWORK NODE, USER EQUIPMENT, NETWORK NODE AND METHODS PERFORMED THEREIN

CROSS-REFERENCE TO RELATED APPLICATIONS

This application is a National stage of International Application No. PCT/SE2022/050409, filed Apr. 28, 2022, which claims priority to U.S. Application No. 63/180,679, filed Apr. 28, 2021, which are hereby incorporated by reference.

TECHNICAL FIELD

Embodiments herein relate to a radio network node, a user equipment (UE), a network node and methods performed therein regarding wireless communication. Furthermore, a computer program product and a computer-readable storage medium are also provided herein. In particular, embodiments herein relate to handling communication, such as handling a service, in a wireless communications network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node e.g. a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate, e.g., enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises, and coordinates various activities of the plural radio network nodes connected thereto. The RNCs are typically connected to one or more core networks.

Specifications for the Evolved Packet System (EPS) have been completed within the 3GPP and present and coming 3GPP releases, such as New Radio (NR) and extensions, are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially “flat” architecture comprising radio network nodes connected directly to one or more core networks.

With the emerging 5G technologies such as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

3GPP is currently working on Release 17 enhancements to first specifications of the 5G system of Release (Rel) 15 and/or 16. These types of enhancements are made to functionality that was introduced in early releases of the 5G specification.

One such functionality is Non-Public Networks, also known as NPNs, that was introduced in Release 16.

3GPP introduced support for two non-public networks deployment options from Release 16. The first NPN option outlines how operators could support non-public networks or dedicated deployments by associating them directly to the operator network. Such improvements resulted in solutions for what is commonly referred to as Public Network Integrated NPN’s (PNI-NPN).

The second NPN option is the stand-alone NPN, or SNPN for short. In almost all aspects, this is a network that carries the same functionality and characteristics as the more commonly known Public Land Mobile Network (PLMN), but it differs in some aspects, e.g., an SNPN is identified by an SNPN ID rather than a PLMN ID. The SNPN ID is composed of a PLMN ID and a Network ID (NID). Additionally, there is no support for mobility between SNPNs, in the same way as is possible between, equivalent, PLMNs and mobility between SNPNs and PLMNs are solved via interworking functionality, in a similar way as for Wi-Fi and PLMNs.

In a cell, herein understood as an entity that sends a broadcast, e.g., system information block one (SIB1) message, there can be one or many NPNs or PLMNs sharing the resources, e.g., frequency and processing capabilities, and such situations are commonly referred to as RAN sharing. Several SNPNs, PNI NPNs and PLMNs can share a cell and when they do, they can be associated with separate cell identities.

System Information Block (SIB) broadcast can thus represent different networks and for each of these, there can be specific identifiers such as Cell IDs, i.e., different “logical” cells, and different Tracking Area Codes (TAC). In the following, NPN will be used to denote both SNPNs and PNI NPNs.

To account also for sharing between PLMNs and NPNs, between PLMNs only or between NPNs only, two different lists have been defined in the broadcast, one for listing NPNs, comprising both SNPNs and PNI-NPNs (or Closed Access Group (CAG) cells), referred to as npn-IdentityInfoList and one for listing PLMNs, referred to as plmn-IdentityList, see below.

These lists are defined in 3GPP Technical Specification (TS) 38.331 v16.3.1 and are broadcast in SIB1.

```
-- ASN1START
-- TAG-CELLACCESSRELATEDINFO-START
CellAccessRelatedInfo ::=            SEQUENCE {
    plmn-IdentityList                PLMN-IdentityInfoList,
    cellReservedForOtherUse          ENUMERATED {true}          OPTIONAL, --
Need R
    ...,
    [[
    cellReservedForFutureUse-r16     ENUMERATED {true}          OPTIONAL,
-- Need R
    npn-IdentityInfoList-r16         NPN-IdentityInfoList-r16   OPTIONAL -- Need
R
    ]]
}
-- TAG-CELLACCESSRELATEDINFO-STOP
-- ASN1STOP
```

The different lists allow an operator, PLMN-specific or, e.g., neutral host operator, to support a number of different PLMNs and NPNs in the broadcast. Abstract Syntax Notation (ASN; ASN1; ASN.1) used herein, e.g., as code snippets, describes what information is/may be communicated in each referenced scenario.

An NPN, identified by a PLMN ID+CAG ID or a SNPN ID, can further be associated with Human Readable Network Name (HRNN) broadcast in SIB10 to facilitate manual network selection. The below is the ASN.1 for SIB10, including an HRNN list.

```
SIB10 information element
-- ASN1START
-- TAG-SIB10-START
SIB10-r16 ::=                  SEQUENCE {
    hrnn-List-r16              HRNN-List-r16              OPTIONAL, --
Need R
    lateNonCriticalExtension   OCTET STRING               OPTIONAL,
    ...
}
HRNN-List-r16 ::=              SEQUENCE (SIZE (1..maxNPN-r16)) OF HRNN-r16
HRNN-r16 ::=                   SEQUENCE {
    hrnn-r16                   OCTET STRING (SIZE (1.. maxHRNN-Len-r16))
OPTIONAL -- Need R
}
-- TAG-SIB10-STOP
-- ASN1STOP
```

SIB10 field descriptions
HRNN-List
The same amount of HRNN elements as the number of NPNs in SIB 1 are included. The n-th entry of HRNN-List contains the human readable network name of the n-th NPN of SIB1. The hrnn in the corresponding entry in HRNN-List is absent if there is no HRNN associated with the given NPN.

The HRNNs were introduced mainly to support manual network selection of an NPN, such that if a UE detects several NPN's by PLMN and/or SNPN ID, it should be possible to also display a relevant network name in association to this, that would make it possible for a user to easier understand and select a network manually.

With Rel-17, enhancements to NPN were studied. These are described in 3GPP TR 23.700-07 v1.2.0, which is a technical report outlining several "key issues", where a key issue is essentially an enhancement area or a new need that should be met.

SNPN access using credentials from a separate entity (Key issue #1)

Key issue #1 describes a situation when a UE can access an SNPN using credentials not from the SNPN itself, but from another, separate entity, which can be another Service Provider, SP, or Subscription Provider.

The challenges related to KI #1 are described in TR 23.700-07 v1.2.0 as:

"This key issue aims at addressing the following points for SNPN along with subscription owned by an entity separate from the SNPN:

How to identify the separate entity providing the subscription.

Network selection enhancements, including UEs with multiple subscriptions;

E.g. how does the UE discover and select an SNPN which provides authentication in an external entity;

Architecture enhancements needed to support multiple separate entities, e.g.:

What are the interfaces exposed and/or used by SNPN and the separate entity;

What is the architecture and solution for a UE accessing a separate entity via SNPN access network;

How to exchange authentication signalling between the SNPN and the separate entity, including:

Authentication by the PLMN, based on PLMN identities and credentials, for access to the SNPN;

Authentication via SNPN to separate entity based on non-3GPP identities (e.g. non-IMSI) and credentials;

Mobility scenarios, including service continuity, for:

UE moving from SNPN #1 with separate entity #1 to SNPN #2 with separate entity #1 available; and UE moving between SNPN #1 (where separate entity=PLMN) and PLMN. NOTE: Security aspects should be defined by SA WG3."

3GPP TR 23.700-07 v1.2.0 indicates the following relevant conclusions for KI #1:

Group ID as a specific case of SNPN ID reusing SNPN ID encoding in TS 23.003, where SIB will be enhanced as follows, for SNPN only:

Indication that "access using credentials from a separate entity is supported"

Optionally, supported Group IDs (GIDs)

Optionally, an indication whether the SNPN allows registration attempts from UEs that are not explicitly configured to select the SNPN In the following, we explain the above conclusions for KI #1.

For a UE to detect, or find, and select an SNPN that supports other, service provider (SP), credentials, the SNPNs can indicate such network capabilities or services. The network would in essence broadcast that it accepts access using certain other credentials.

It is also envisioned that the possibility to access certain SNPNs with certain SP credentials may not be a static association between SNPNs and SP's, but rather that SP's would seek to add further SNPNs to its list of networks that can be accessed, e.g., through new agreements. Similarly, it may be in the interest of SNPN operators to attract more traffic to their network by adding agreement with more SP's. To avoid that such evolving business relations drive too much of management and upgrade tasks, the standard specifies a Group ID. The Group ID can be viewed as aggregation of several SP's, allowing that SNPNs that support access using credentials from these SP's does not have to broadcast more than support for the Group ID, instead of broadcasting support for each and every SP identity, and the UE would then be able to associate the Group ID with SNPNs that allow access with SP credentials included in the group.

Furthermore, it was also concluded to allow an SNPN to indicate whether it allows registration attempts from UEs that are not explicitly configured to select this SNPN, hence enabling UEs to perform blind registration attempts, which eventually, may fail if the SNPN does not have means to authenticate the UE.

FIG. 1*a* shows an association between SNPN and, group of, SPs, the latter being identified by a GID Note that SP (service provider) is also referred to as "Credentials Holder (CH), being equivalent in meaning to the SP. The GID is thus a means to associate the SP with possible SNPNs to access. Its main benefit is an easier handling of changes to the relations between the SPs and the SNPNs and an easier broadcast of support. (Note that the GID is sometimes referred to as Group ID for Network Selection (GIN).

In the 3GPP TR 23.700-07 v1.2.0, the following UE behavior is captured:

UE selects an available and allowable SNPN which broadcasts "access using credentials from a separate entity is supported" indication and a GID contained in the separate entity-controlled list, if available.

In other words, a UE that is equipped with credentials from a service provider that can be used to access certain SNPNs, is thus also configured with one or more GIDs. When the UE is moving around, and performing network selection, it can scan and detect available networks and for a UE accessible SNPNs then broadcast a GID that corresponds to one the UE is preconfigured with. By associating a network ID to the GID, from the networks included in the npn-IdentityInfoLists an SNPN selection can be made that corresponds to the GID the UE is configured with and for this GID, the SNPN allows access using credentials from the UE's SP.

In addition, for manual network selection, whereby a user is being displayed a list of available network and manually select a network, the TR states:

For manual SNPN selection the UE presents all available SNPNs, which broadcast the "access using credentials from a separate entity is supported" indication.

It has thus also been proposed in 3GPP to broadcast a human readable name for the GIDs similar to HRNN used for NPNs. The human readable name for the GID, herein referred to as a Human Readable Group Name (HRGN), would be displayed to the user during the manual network selection so that the user can identify the group of SPs associated with an SNPN.

A similar group ID (GID), to what has been described above is also being discussed in connection to another of the Key Issues, referred to as "UE onboarding", see TS 23.700, v1.2.0, where onboarding is referred to as Key issue #4:

Architecture and solutions to support UE onboarding and provisioning for the NPN. The term "Onboarding" refers to enabling connectivity to the UE for realizing remote provisioning, and in some cases the term "Onboarding" includes both enabling the connectivity as well as the remote provisioning of the UE with NPN credentials. This key issue includes some common aspects such as:

Means for a UE, that is verifiably secure and uniquely identifiable to 5GS, for onboarding and remote provisioning;

Support of exposure via APIs to support UE onboarding and remote provisioning, if required.

How does the UE discover and select the onboarding SNPN before UE NPN credentials and other information to enable UE to get 3GPP connectivity are provisioned.

FIG. 1*b* shows a UE onboarding procedure and GID addition.

In relation to onboarding work it has been proposed that the GID can also be used to indicate a group of manufacturers, which provide UEs with default credentials for purposes of onboarding. SNPNs that support onboarding using default credentials from these manufacturers, would broadcast an onboarding indication and the GID identifying these manufacturers.

The GID usage is included in clause 8.4.1 of the updated TR 23.700-07 v2.0.0:

"

[ . . . ] The UE may or may not be pre-configured with O-SNPN network selection information (e.g. O-SNPN network identifiers or Group ID(s)). The O-SNPN network selection information can assist the UE such that the UE either preferably or exclusively select an O-SNPN corresponding to the O-SNPN network identifiers or Group ID(s).

NOTE 2: The format of the pre-configured information assisting the UE for O-SNPN selection is not specified.

NOTE 3: The Group ID(s) in the SIB that UE can use for selecting an O-SNPN are the same as the Group ID(s) in the SIB that the UE uses for SNPN selection as part of KI #1.

"

Both of the above Key issues share some aspects related to accessing an SNPN. For SP credentials it is about finding an SNPN that supports access with certain credentials, for onboarding, it is about finding an SNPN that supports onboarding. In both of the situations, a Group ID bridges access through SP or onboarding with networks that support such services, for the purpose that a UE should be able to find and select a network and/or SNPN that supports, either the SP or the onboarding.

SUMMARY

As part of developing embodiments here one or more problems were first identified. As described in the background section, for the access using CH credentials and the onboarding service, in the future it is likely that additional services will be offered and for such services, UEs may not even have credentials to access networks or subscribe to services beforehand, but must onboard to both a network and a service. Also, there may be multiple networks providing same or similar services, some that the UE may use with existing credentials and/or subscription and some that may be used if the UE first performs onboarding to get provisioned with new credentials and subscription. The relation between a UE, the network, e.g., PLMN, PNI-NPN, or SNPN, and the service offered may evolve such that UEs may onboard to different networks by acquiring credentials on demand, and through the different networks, different types of services may be offered, by either the network operators themselves, or by 3rd party service providers that offer their services, making the PLMNs, PNI-NPNs or SNPNs a "hosting network" for such services. A development may be envisioned wherein the central aspect of an association between a UE and a network is not for purposes of being associated to a specific network, but rather to be associated with a specific service.

The current enhancements in 3GPP in association to the key issues described above does not solve or address such service-centric view, as in all aspects, the mechanisms are put in place to support a network selection, not a service selection.

In related discussions a number of different solutions to challenges have been addressed, associated to broadcasting information and support UE to find a network and a specific service.

U.S. application 63/164,595, describes various aspects of efficient encoding of broadcast for connecting Group ID to an SNPN ID.

U.S. application 63/167,156 introduces additional services represented by, e.g., a service ID or similar representation, which is associated with a Group ID and broadcast of such service IDs. The document also introduces alternative GID encoding approaches to minimize the number of bits for the GID encoding using different GID assignment modes.

U.S. application 63/167,165 introduces additional service information, such as Human Readable Service Information (HRSI) that may be used in particular for manual selection procedures. Methods for how the HRSI may be broadcast and connected with the corresponding, explicitly/implicitly indicated, service identities are outlined and in addition, HRSI content is expanded to also support expanded service information such as how to acquire credentials for access to networks and for subscribing to services including also various charging methods, costs, or time and locality information.

Herein an approach is described for providing information to the UE by the network and methods in the UE for using this information to access a network and get a desired service.

An object herein is to provide a mechanism to handle communication, such as a service, in an efficient manner in the wireless communications network.

According to an aspect the object is achieved, according to embodiments herein, by providing a method performed by a radio network node for handling communication in a wireless communications network. The radio network node receives, from a UE, an indication indicating selection of a service associated with a service indication out of at least one service indication. The indication may be a service ID, an index of the service ID or a GID. The radio network node, based on the received indication, selects a network node such as an AMF that supports the service indicated by the indication. The radio network node may then transmit a service request to the selected network node.

According to another aspect the object is achieved, according to embodiments herein, by providing a method performed by a user equipment for handling communication in a wireless communications network. The UE detects at least one service indication in a SI broadcast from a radio network node. The UE selects a service indication out of the at least one service indication from SI broadcast to represent the service the UE targets association with. The UE 10 then transmits an indication indicating selection of the service associated with the selected service indication.

According to yet another aspect the object is achieved, according to embodiments herein, by providing a method performed by a network node for handling communication in a wireless communications network. The network node receives from a radio network node an initial message with a service request. The service request may indicate the service indication and UE requesting the service. The network node selects a network for providing the requested service and responds to the radio network node 12 with a network indication of the selected network.

According to still another aspect the object is achieved, according to embodiments herein, by providing a radio network node, a network node and a UE configured to perform the methods, respectively.

According to still another aspect a radio network node for handling communication in a wireless communications network. The radio network node is configured to receive, from a UE, an indication indicating selection of a service associated with a service indication out of at least one service indication. The indication may be a service ID, an index of the service ID or a GID. The radio network node is configured to, based on the received indication, select a network node such as an AMF that supports the service indicated by the indication. The radio network node may then transmit a service request to the selected network node.

According to another aspect the object is achieved, according to embodiments herein, by providing a method performed by a user equipment for handling communication in a wireless communications network. The UE detects at least one service indication in a SI broadcast from a radio network node. The UE selects a service indication out of the at least one service indication from SI broadcast to represent the service the UE targets association with. The UE 10 then transmits an indication indicating selection of the service associated with the selected service indication.

According to yet another aspect the object is achieved, according to embodiments herein, by providing a method performed by a network node for handling communication in a wireless communications network. The network node receives from a radio network node an initial message with a service request. The service request may indicate the service indication and UE requesting the service. The network node selects a network for providing the requested service and responds to the radio network node 12 with a network indication of the selected network.

It is furthermore provided herein a computer program product comprising instructions, which, when executed on at least one processor, cause the at least one processor to carry out the method above, as performed by the radio network node, the network node, and the UE, respectively. It is additionally provided herein a computer-readable storage medium, having stored thereon a computer program product comprising instructions which, when executed on at least one processor, cause the at least one processor to carry out the method according to the method above, as performed by the UE, the network node, or the radio network node, respectively.

Embodiments herein disclose a way of, instead of selecting a network, selecting a service, represented by a service indication such as a group ID (GID), a service ID of any format indicating the desired service, even a human readable service information format. The UE is transmitting, e.g., signalling, to the radio network node the indication of the selected service, and the radio network node the based on selected service, for example, group ID or service ID, performs an association to a network supporting the selected service. The association may be made by forwarding an access request from the UE to a network node such as an Access and Mobility management Function (AMF) associated with the network supporting the service. The UE is informed of the selected network in a subsequent step and procedures for registration to the network is pursued.

The selection of the service in the UE may either be manual or automatic, based on a trigger from, e.g., an application layer or another higher layer in the UE.

In some embodiments herein, the UE is, in addition to providing indication of selected service indication to the network prior to network performing network selection, also providing additional information, such as information about Home PLMN or information about expected duration of requested service, or other information that may steer or restrict the way the network selection is done in the radio network node. In some embodiments, the selected service indication may be accompanied by the additional information related to, for example, desired quality or quality range, cost or cost range, available credentials that the UE may already have, desired means of transaction to acquire new necessary credentials and desired time-of-service.

In another aspect of embodiments herein a UE may select a service in a network that it has already registered to, using the same mechanisms that are used for selecting a service for purposes of allowing the network to make a network selection. In this embodiment, a UE may, from a number of different service IDs or GIDs that are broadcast in the cell, select one service or one GID using the same signalling methods as that of network selection. The radio network node may then forward the selected service to an AMF and/or other network control node that triggers actions necessary to associate the UE with the service indicated. These actions may be, for example, enable subscription to service, both in situations when the service is provided by the access network, or when the service is provided from a 3rd party that is not operating an access network.

By letting the UE directly proceed to select the desired service, it is possible, on one hand to simplify the UE's selection process and on the other hand, to reduce the burden on the network broadcast by letting the network itself do the selection.

An additional advantage is that it is possible for a network to advertise its services, or for a node representing many networks to advertise the sum of all available services and allow selection of such service, without requiring that the UE knows what network that is providing said service.

Decoupling service from the network selection at the UE also helps to improve reliability since instead of relying on a specific network offering the service the UE may be served by any network offering that service.

Hence, embodiments herein provide a mechanism to efficiently handle communication in the wireless communications network.

BRIEF DESCRIPTION OF THE DRAWINGS

Embodiments will now be described in more detail in relation to the enclosed drawings, in which.

DETAILED DESCRIPTION

Figure 1A:
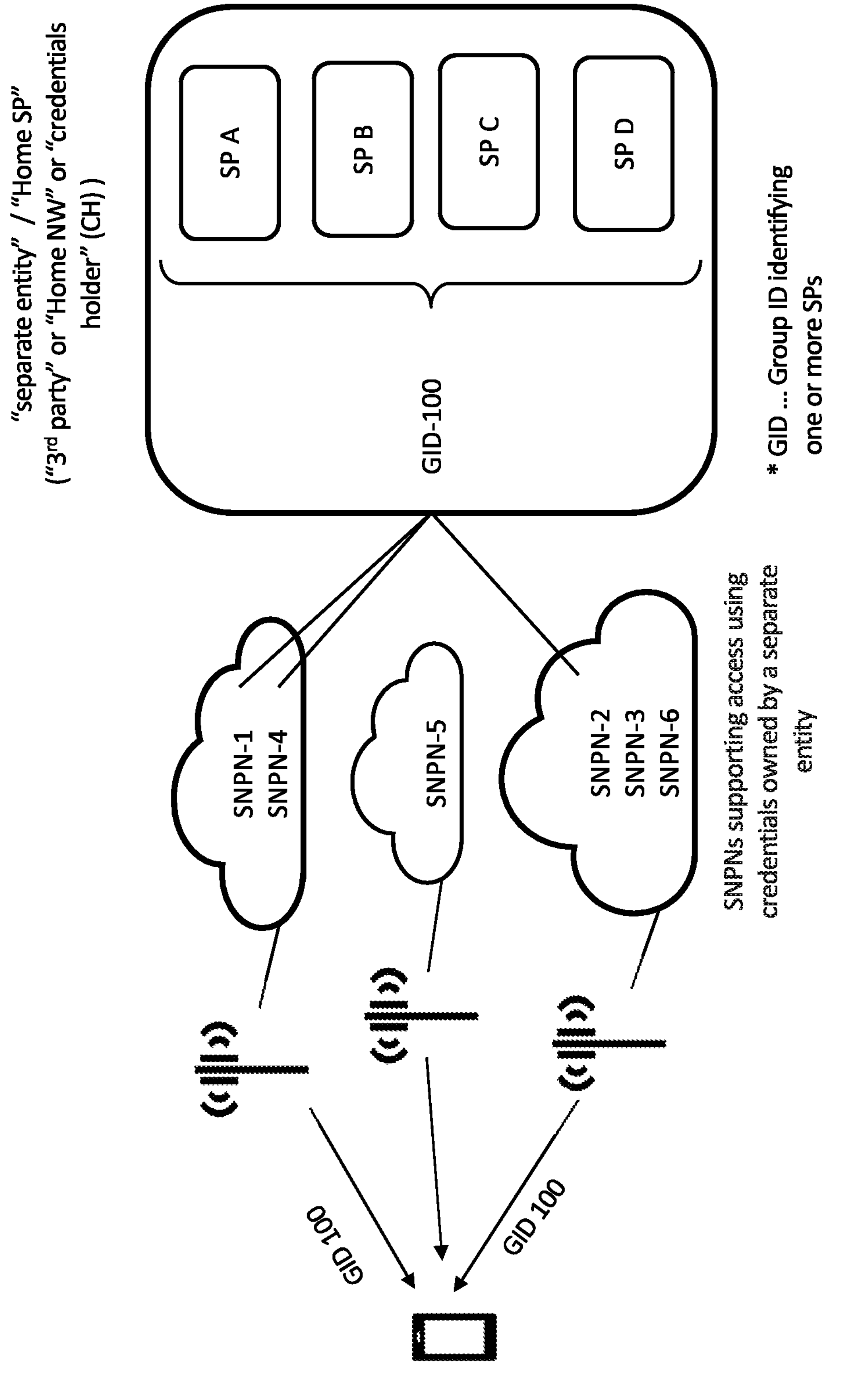
FIG. 1*a* shows an architecture according to prior art.
Figure 1B:
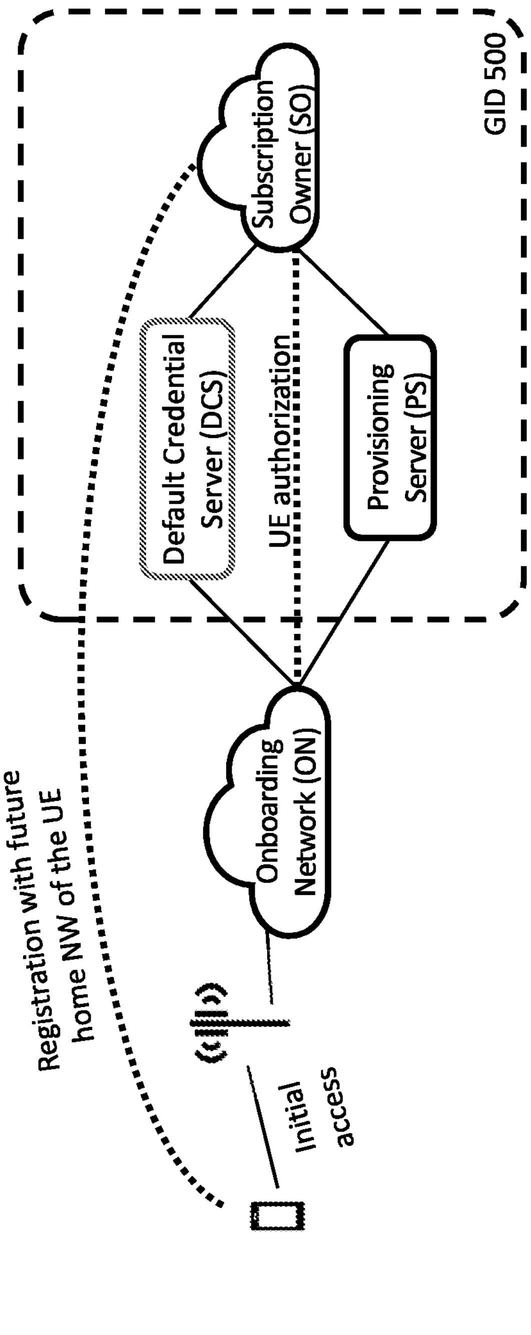
FIG. 1*b* shows an architecture according to prior art.
Figure 2:
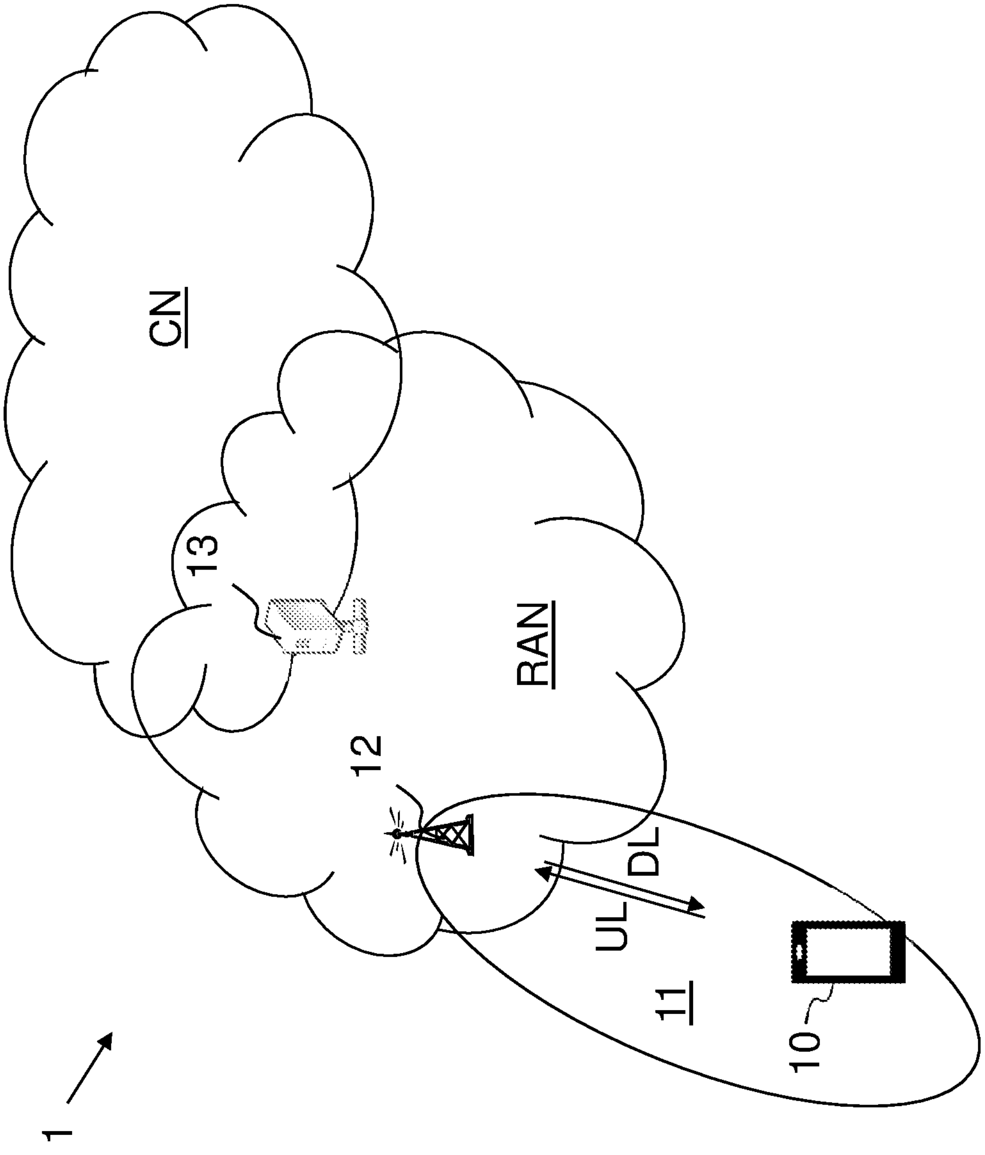
FIG. 2 shows a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies.

Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10, exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a radio network node 12 providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the UE in form of DL transmissions to the UE and UL transmissions from the UE. It should be noted that a service area may be denoted as cell, beam, beam group or similar to define an area of radio coverage.

The wireless communications network further comprises a network node 13 for handling services in the wireless communications network. The network node 13 may be a control node such as a mobility management entity (MME) or an AMF.

In the embodiments described herein the UE 10 makes a service selection in the wireless communications network 1 in that the UE 10 detects at least one service indication, such as a service ID, in a SI broadcast from the radio network node 12. The UE 10 selects, for example, based on UE preference, a service indication out of the at least one service indication from SI broadcast to represent a service the UE targets association with. The UE 10 then signals in the wireless communications network 1, e.g. to the radio network node 12, an indication indicating selection of a service associated with said service indication. The UE 10 may signal the indication when the UE 10 is not registered to any network such as SNPN or PLMN. Alternatively, the UE 10 may signal the indication when the UE 10 is already registered to an SNPN or PLMN and the signalling of the indication is to a network the UE is already registered to. Alternatively, the UE 10 may signal the indication when the UE 10 is already registered to an SNPN or PLMN and the signalling of the indication is to a network the UE is not registered to.

Figure 3:
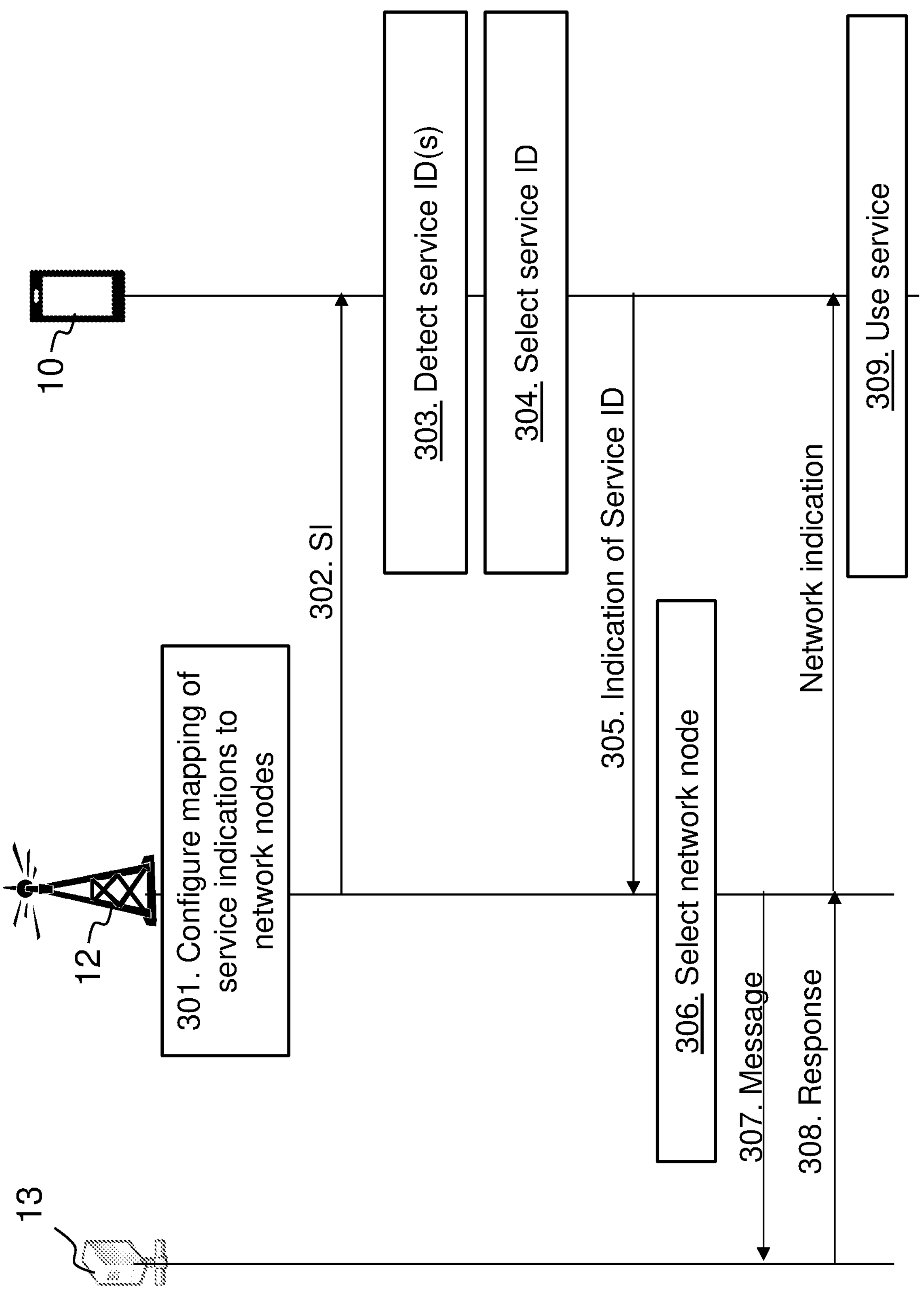
FIG. 3 shows a combined signalling scheme and flow chart according to embodiments herein.

The radio network node 12 may then transmit a selected network indication to the UE 10 e.g. in a message. The message may comprise an identity of the selected network in a non access stratum (NAS) message. The radio network node 12 may further transmit additional information to the UE 10. The additional information may comprise one or more of the following: payment of service, cost of service, duration of how long the service may be used, different quality-of-service levels etc. The selected network indication may be comprised in a radio resource control (RRC) message such as an RRC setup complete message, that ends setup of a radio resource control setup for the UE 10. An indication may be represented by a value, a name or similar FIG. 3 is a combined signalling and flowchart scheme according to embodiments herein.

Action 301. The radio network node 12 may be configured with service indications and mapping between network nodes providing services of the respective service indication.

Action 302. The radio network node 12 may transmit or broadcast SI, wherein the SI comprises a service indication such as a service ID indicating a type of service offered by one or more networks.

Action 303. The UE detects at least one service ID in the SI broadcast from the radio network node 12.

Action 304. The UE 10 selects, for example, based on UE preference, a service ID out of the at least one service ID from SI broadcast to represent a service the UE targets association with.

Action 305. The UE 10 then transmits the indication indicating selection of the service associated with the service ID. The indication may be the service ID or a GID. The indication may be transmitted in an access request.

Action 306. The radio network node 12, based on the received indication, selects a network node 13 such as an AMF that supports the service indicated by the indication. The radio network node 12 may when selecting the network node 13, in addition to selected service, also take into consideration one or several of: desired quality or quality range, cost or cost range, available credentials that the UE may already have, desired means of monetary transaction to acquire new necessary credentials, and desired time-of-service. The selected network node 13 may represent one of several network nodes that supports the service indicated by the indication, wherein the selected network node 13 is one out of more than one network node that is selectable for the service. The selection of the network node 13 may follow one or more prioritization rules for said service.

Action 307. The radio network node 12 may then transmit an initial message to the selected network node 13. For example, a message carrying a service request for the UE.

Action 308. The network node 13 may respond to the radio network node 12 with an indication of a selected network and the radio network node 12 may forward a network indication of the selected network to the UE 10.

Action 309. The UE 10 may then use the service from the network indicated by the network indication.

Figure 4:
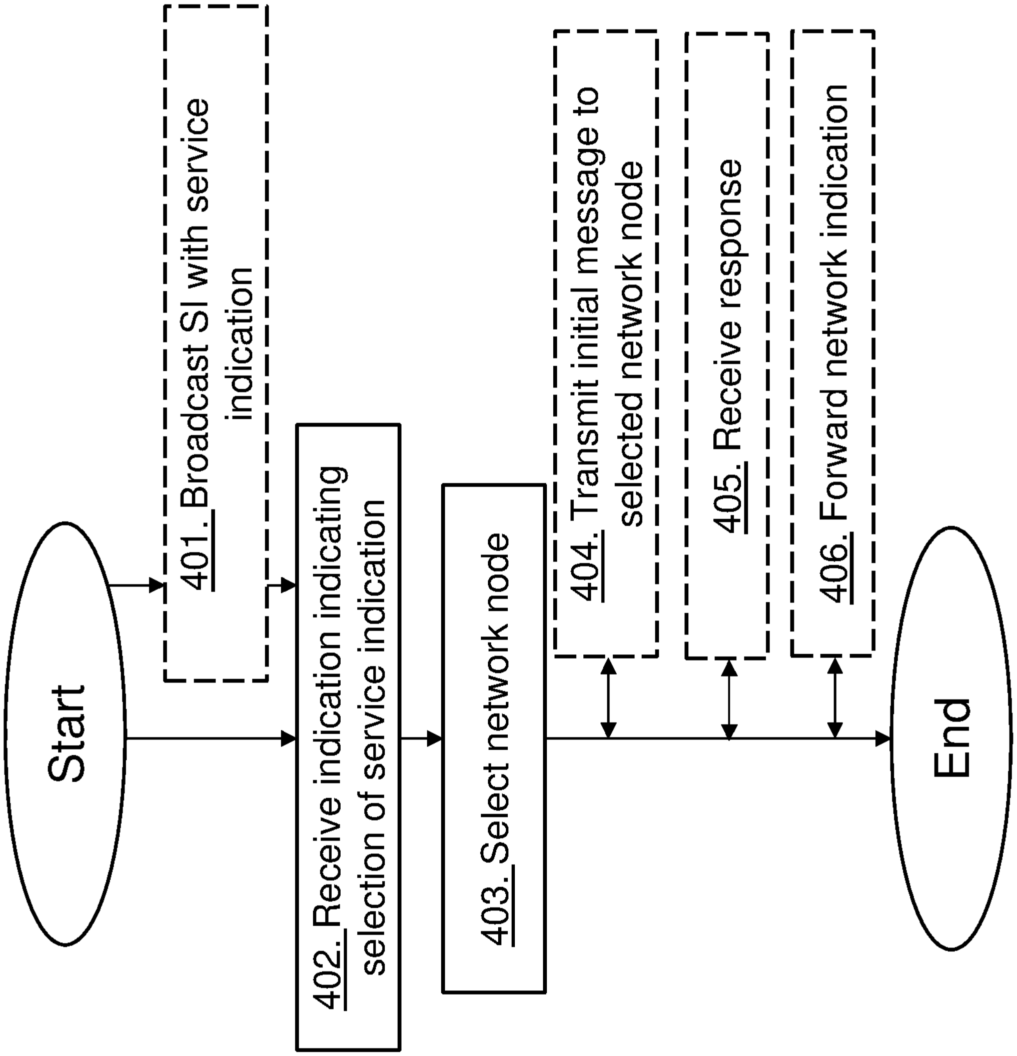
FIG. 4 shows a flow chart depicting a method performed by a radio network node according to embodiments herein.

The method actions performed by the radio network node for handling services in the wireless communications network according to embodiments will now be described with reference to a flowchart depicted in FIG. 4. The actions do not have to be taken in the order stated below but may be taken in any suitable order. Dashed boxes indicate optional features.

Action 401. The radio network node 12 may be configured with a mapping of service indications, such as service IDs, and networks providing the respective service. The radio network node 12 may transmit or broadcast the SI, wherein the SI comprises at least one service indication such as a service ID indicating a type of service offered by one or more networks.

Action 402. The radio network node 12 receives, from the UE 10, an indication indicating selection of a service associated with a service indication out of the at least one service indication. The indication may be a service ID, an index of the service ID or a GID. The indication may be received in an access request. The radio network node 12 may further receive additional information (or an information indication indicating additional information) from the UE 10, wherein the additional information comprises one or more of the following: a desired quality or quality range, a cost or cost range, available credentials that the UE may already have, desired means of monetary transaction to acquire new necessary credentials, and desired time-of-service.

Action 403. The radio network node 12, based on the received indication, selects a network node such as an AMF that supports the service indicated by the indication. The radio network node 12 may when selecting the network node, in addition to the service indicated by the indication, also take into consideration the additional information. The selected network node may represent one of several networks that supports the service indicated by the indication. The selected network node is one out of more than one network node that is selectable for the service. The selection of the network node may follow one or more prioritization rules in the radio network node 12 for said service.

Action 404. The radio network node 12 may then transmit an initial message to the selected network node 13.

Action 405. The radio network node 12 may receive a response from the network node 13 indicating a selected network.

Action 406. The radio network node 12 may then forward to the UE 10, a network indication of the selected network.

Figure 5:
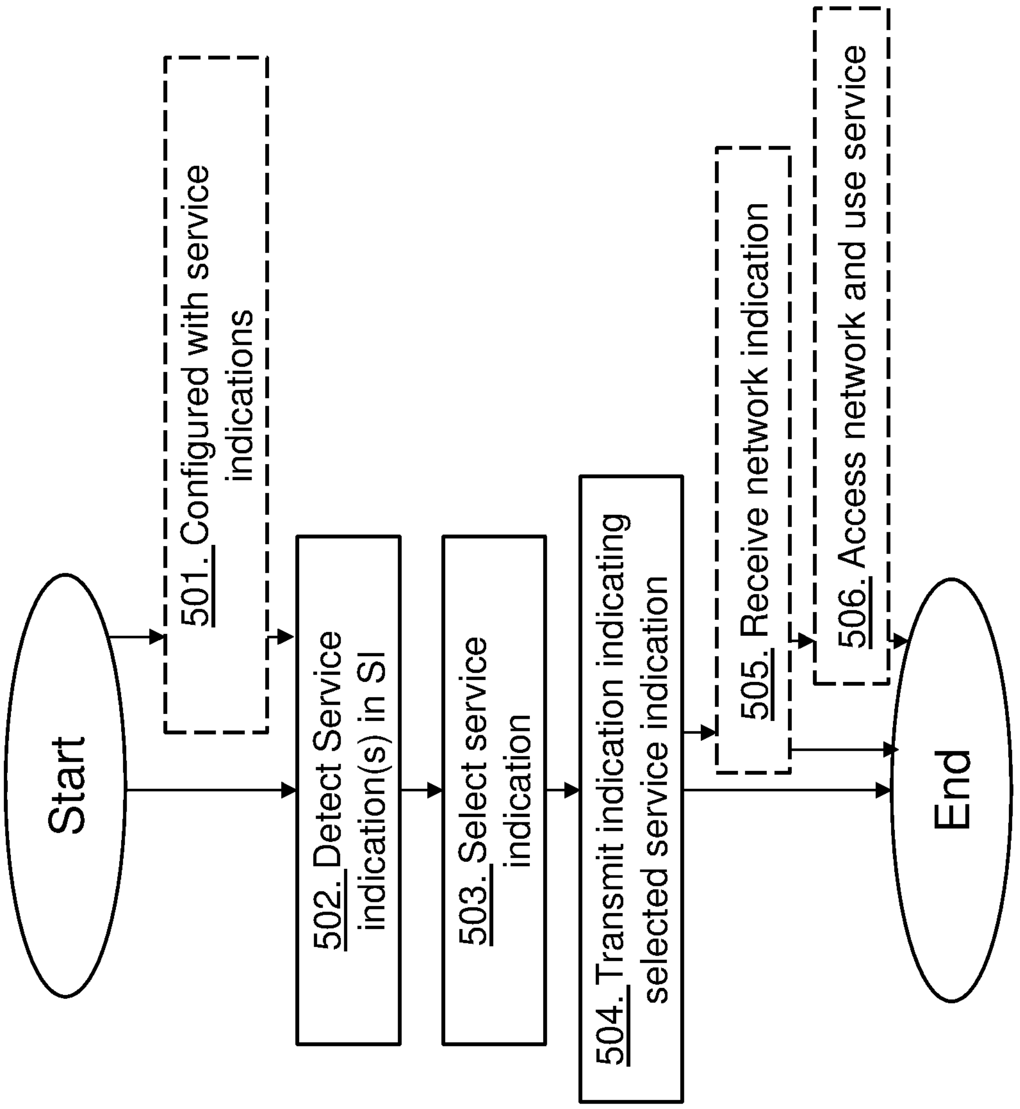
FIG. 5 shows a flow chart depicting a method performed by a user equipment according to embodiments herein.

The method actions performed by the UE 10 for handling communication (services) in the wireless communications network according to embodiments will now be described with reference to a flowchart depicted in FIG. 5. The actions do not have to be taken in the order stated below, but may be taken in any suitable order. Dashed boxes indicate optional features.

Action 501. The UE 10 may be configured, e.g., preconfigured or configured by the radio network node 12, with a mapping, wherein the mapping maps one or more service indications to a respective service.

Action 502. The UE detects, e.g., reads, at least one service indication in the SI broadcast from the radio network node 12.

Action 503. The UE 10 selects the service indication out of the at least one service indication from SI broadcast to represent the service the UE 10 targets association with. The UE 10 may select service indication based on a UE preference such as based on service name, possible data rate, costs, charge, duration of time. The UE may receive this additional information from the radio network node 12. The UE preference may be based on received additional information from the radio network node 12.

Action 504. The UE 10 then transmits the indication indicating selection of the service associated with the service indication. The indication may be the service ID, the index of the service ID, or a GID. The indication may be transmitted in an access request.

Action 505. The UE 10 may receive from the radio network node 12 the network indication of the selected network.

Action 506. The UE 10 may then access the selected network based on the network indication and use the service.

Figure 6:
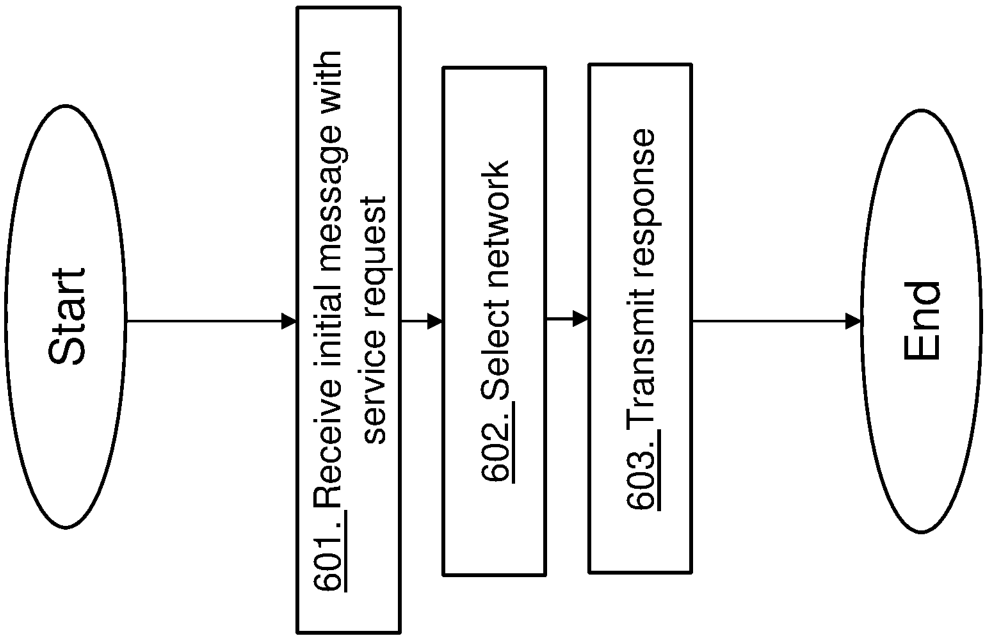
FIG. 6 shows a flow chart depicting a method performed by a network node according to embodiments herein.

The method actions performed by the network node 13 for handling communication (services) in the wireless communications network according to embodiments will now be described with reference to a flowchart depicted in FIG. 6. The actions do not have to be taken in the order stated below, but may be taken in any suitable order.

Action 601. The network node 13 receives from the radio network node 12 an initial message with a service request. The service request may indicate the service indication and UE requesting the service. The service request may further indicate the additional information comprising one or more of the following: a desired quality or quality range, a cost or cost range, or available credentials that the UE already has, desired means of monetary transaction to acquire new necessary credentials, and desired time-of-service.

Action 602. The network node 13 selects a network for providing the requested service.

Action 603. The network node 13 further responds to the radio network node 12 an indication of a selected network.

Figure 7A:
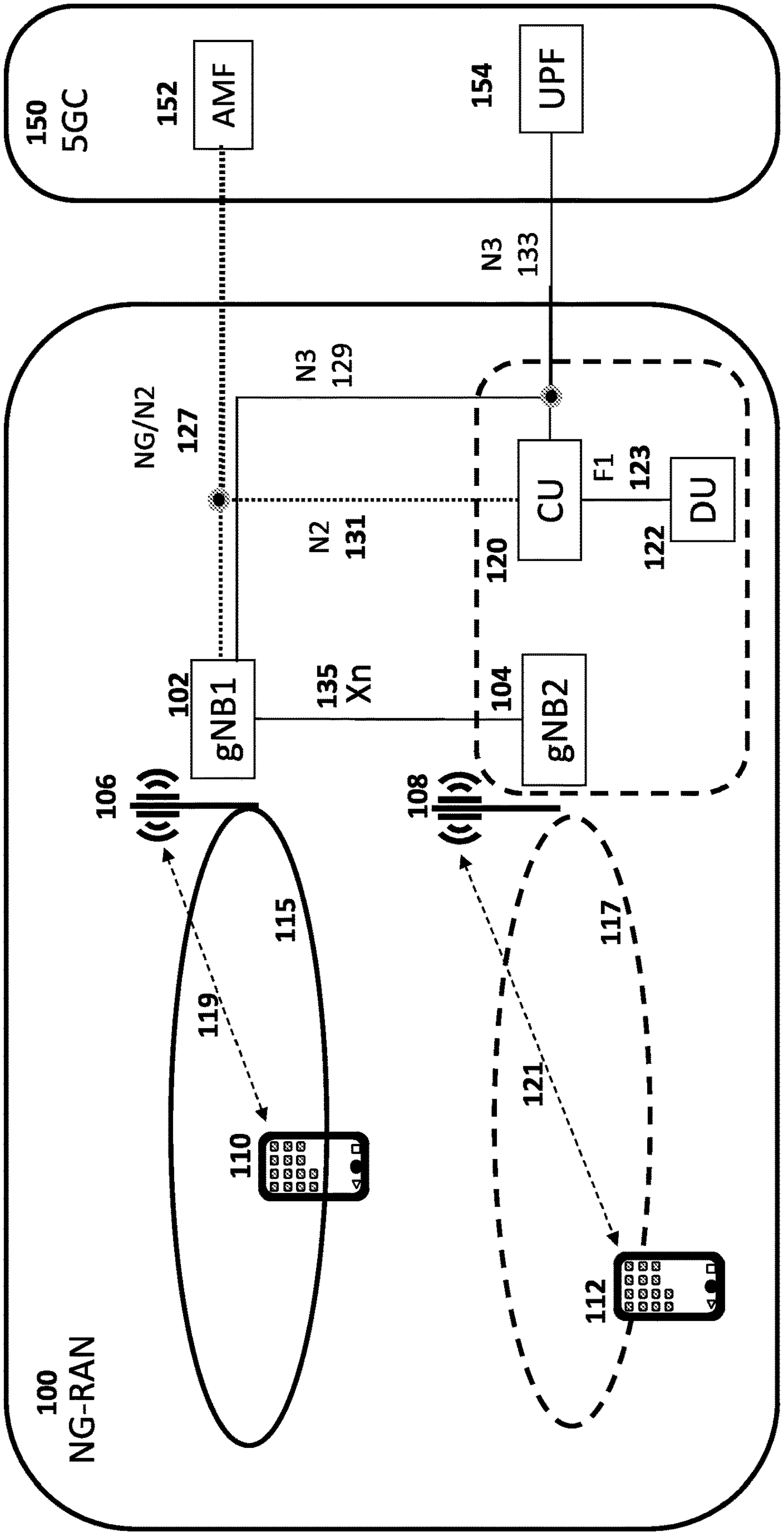
FIG. 7*a* shows an exemplary 5G communication system comprising 5GC and NG-RAN.
Figure 7B:
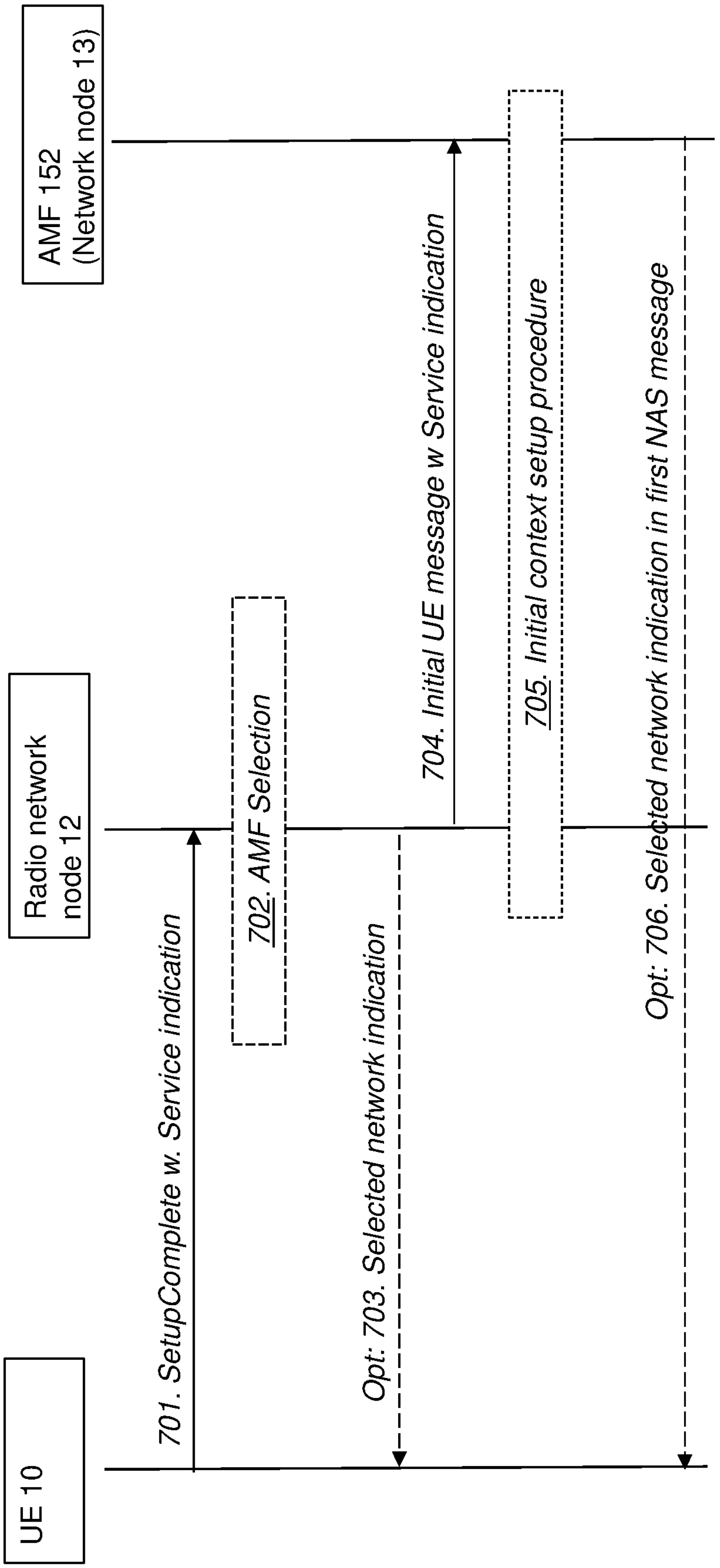
FIG. 7*b* shows a schematic overview depicting a service selection at the UE according to embodiments herein.

FIG. 7*a* shows an exemplary 5G communication system comprising 5GC and NG-RAN.

FIG. 7*a* illustrates an exemplary communication system pursuant to 3GPP specifications for fifth generation core (5GC) 150 and NG-RAN (5G Radio Access Network) 100, as described in, e.g., 3GPP TS 23.501 v16.7.0, TS 38.300 v16.4.0 and TS 38.401 v16.4.0.

The 5G-RAN or NG-RAN consists of gNBs 102,104, examples of the radio network node 12, that connects to antenna elements 106, 108 via which wireless communication 119, 121 is possible to/from UEs 110,112, examples of the UE 10, within a certain coverage area 115, 117. The interface between the gNB and the UE is sometimes referred to as the Uu interface. Different gNB's may connect to each other via a direct interface referred to as Xn 135 interface. This interface is typically used for mobility between different gNB's, e.g., when UE's move between different coverage areas served by different gNB's. In the figure gNB2 104 is illustrated with additional details in how it may be built-up. A gNB may consist of a Central Unit (CU) 120 and at least one Distributed Unit (DU) 122. The CU 120 may connect via an F1 interface 123. The gNB's are then connected to two different nodes in the 5G Core network, one for the user plane traffic and one for control plane traffic. The interface for control plane NG/N2 127, 131 towards an Access and Mobility management Function (AMF) 152 and the interface for user plane traffic N3, 129, 133 for communication towards a User Plane Function 154, UPF. The standard describes, e.g., N5, N7, etc., to be the reference point between two nodes/end points, we use it to be synonymous to interface, as is sometimes done also in specifications. The connection to the core network goes in the illustration above via the CU in the gNB, as exemplified by gNB2 104 and CU 120. It may be the role of the gNB to terminate the control signalling that establishes and controls the air interface connection towards the UE. It may further be the role to be the communication point towards the radio access network 100 for the core network 150. While the interfaces have been denoted with, e.g., N5, N7 etc. in the figure (N+number) this is usually referring to a reference point between the different nodes, in this description the same denotations may be used to denote the interfaces between the entities in its entirety.

According to embodiments herein, the radio network node 12 may support a number of services where each service is associated to a service indication such as a service ID. The radio network node 12 may broadcast system information (SI) with at least one service indication. The service indication may be a service ID, a format of a Group ID, or it may follow a Group ID+Service type indication, or it may even be on a human readable format. If the service indication is some type of numerical value, there may in addition be a Human Readable Service Information (HRSI) associated to the service indication. The radio network node 12 may associate different networks to different services, and some services may be possible to use through a number of different networks. The networks that are reachable through the radio network node 12 may be represented by an entry in one of the network identity lists, npn-IdentityInfo or PLMN-IdentityLists that are broadcast in a system information block (SIB1).

The radio network node 12 and/or the network node 13 also includes selection mechanisms and/or rules such that for any given selection of a service from the UE 10, the service indication may be mapped and/or associated to a specific network in the network node 13. It is not necessary that a service provider and a network is the same entity. The services, as represented by the service indications, may be offered by, e.g., 3rd party providers that doesn't even operate any of the selectable networks, or it may be directly operated by the networks that are represented in the network node 13. The radio network node 12 is typically a gNB in an NG-RAN or an access node in any other access network.

In connection to the service indication, as described above, more detailed information related to the service may be available. Such additional information may be related to, e.g., payment of service, cost of service, duration of how long the service may be used, different quality-of-service levels etc. Even such additional information as valid credentials may be included. Such indications may correspond to informing the UE 10 that services may be accessed/enjoyed/used with credentials from public land mobile network (PLMN) operator N, SNPN operator D, etc., or services may be accessed if the UE 10 is configured to belong to the same Group ID as the service corresponds to, in case the Service indication is of a Group ID format.

According to embodiments herein, the UE 10 will read the SI for services as described above and, instead of making a network selection as is the normal behaviour before a UE has registered with the network, based on the service indications, the UE 10 will make a service selection. The service selection, whether it is done via an automated or application-triggered mechanism in the UE 10 or whether executed as a manual service selection mode, is represented by the indication in a message to the radio network node 12. In NG-RAN, it is standardized that the UE 10 includes a selected network, a PLMN or NPN identity in connection to an RRC Setup Complete message as described in 3GPP TS 38.331. Instead of including a network ID in the message, the indication such as a service ID would be included according to embodiments herein. The UE 10 would thus let the radio network node 12 know what service (but not necessarily what network) the UE 10 is interested in.

Based on the indication from the UE 10, the radio network node 12 may assume the responsibility to associate the service request with a network supporting the service. The radio network node 12 may perform the selection via, for example, rules that allow for a mapping of network nodes, such as AMFs, that are associated with networks that support the selected service. The radio network node 12 may for example hold a mapping between services and AMFs such that it selects a predetermined network node per service, or that the radio network node 12 selects one of several possible network nodes for a service according to some more advanced prioritization of network, or using a round-robin mechanism. Aspects that may determine what network that is feasible to select for a UE requesting a service would be if the network had any additional information from the UE regarding, e.g., desired service quality or quality range, cost or cost range, available credentials that the UE may already have, desired means of monetary transaction to acquire new necessary credentials, and desired time-of-service, velocity, load, or home PLMN identity. The UE 10 may not only convey the indication indicating the selected service in a setup complete message, but may also convey any other conditions for selecting a network, if such exist, e.g. related to prioritization of networks among the list of networks. The inclusion of the indication in the setup complete message may be performed to signal to the network, irrespective whether a PLMN ID or network ID is indicated. And the service is prioritized over the network, meaning that the UE 10 wants the service, possibly on a certain network that may be indicated, but if not supported, on another network.

As listed above, in some embodiments herein, also for the purpose of making an optimal network selection, the UE 10 may provide UE additional information such as if it is a high-speed or a stationary UE, if the service is going to be enjoyed/used for long, with or without mobility etc. This type of UE additional information may support the radio network node 12 in making the best network selection for the requested service.

FIG. **7*b* is an illustration of the actions and signalling in between the UE 10, the radio network node 12 and the AMF 152 being an example of the network node 13**.

Action 701. The UE 10 reads system information and selects a service (not illustrated in FIG. **7*b*). The UE 10 may select a desired service in a message to the radio network node 12**, e.g., a setupComplete message w. service indication.

Action 702. The radio network node 12, for example, based on the above-described rules for a selected service, and potentially UE additional information from the UE 10, e.g., received in the setupComplete message or through other means, selects an AMF 152 to forward the service request to.

Action 703. The radio network node 12 may let the UE 10 know immediately what network that has been selected, before or in combination with forwarding an initial UE message including the service indication. This is illustrated by the dashed line between the radio network node 12 and the UE 10 after AMF selection. This information may be sent to the UE 10 in association to the initial UE message to the AMF 152, see Action 704. The AMF 152 and the radio network node 12 may then initiate a context setup procedure, Action 705. In an alternative embodiment, the selected network indication is not sent by the radio network node 12 to the UE 10, but rather by the AMF 152 in subsequent signalling, Action 706. In these scenarios, the selection of network is formally performed by the AMF 152, not by the radio network node 12. The radio network node 12 may then only select an AMF based on the service indication from the UE 10. The options are illustrated in the figure.

Figure 8:
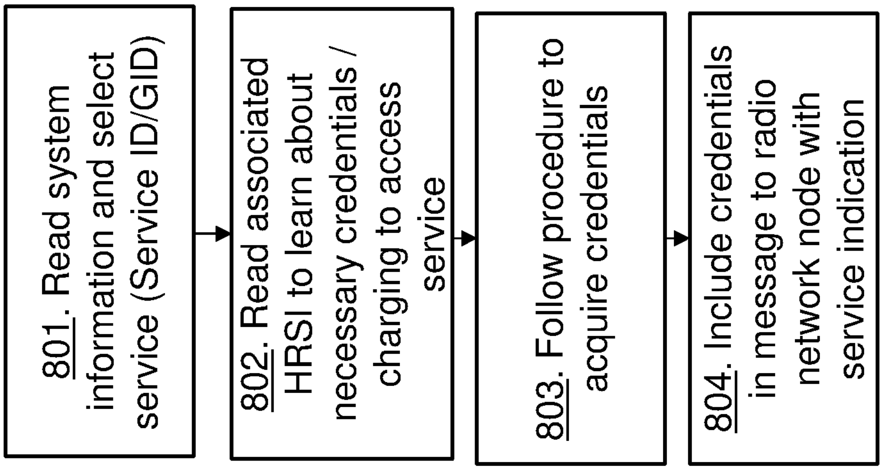
FIG. 8 shows a flow chart depicting a method for UE to acquire credentials to access a service according to embodiments herein.

As shown in FIG. 8 the selection of service may be preceded by a procedure for acquiring credentials to access the service, as in such embodiments, a selection of service ID may need to be associated with an indication on what credentials the UE 10 would have or use to access the network. How this may be performed, if not already available in the UE 10, may be included as an instruction and part of human readable service information, or it may be indicated via other standardized coding in a broadcast to the UE 10. Thus, before the UE 10 sends a selected service ID to the radio network node 12, the UE 10 may pursue a process of acquiring credentials to access the service.

Action 801. The UE 10 reads system information and select service (Service ID/GID).

Action 802. The UE 10 may read associated HRSI to learn about necessary credentials and/or charging to access the service.

Action 803. The UE 10 may then follow a procedure to acquire credentials. Thus, between having identified service and signalling to the network an attempt to access the network to get the service, a procedure for acquiring necessary credentials may be performed. This procedure may for example be to acquire the credentials via a separate internet connection, or it may be performed in a very similar way as an onboarding procedure that is outlined in the background, in this case it would then be an onboarding to a service and not to a network.

Action 804. The UE 10 may then include credentials (indications of the credentials) in the message to the radio network node 12 with the service indication.

Figure 9:
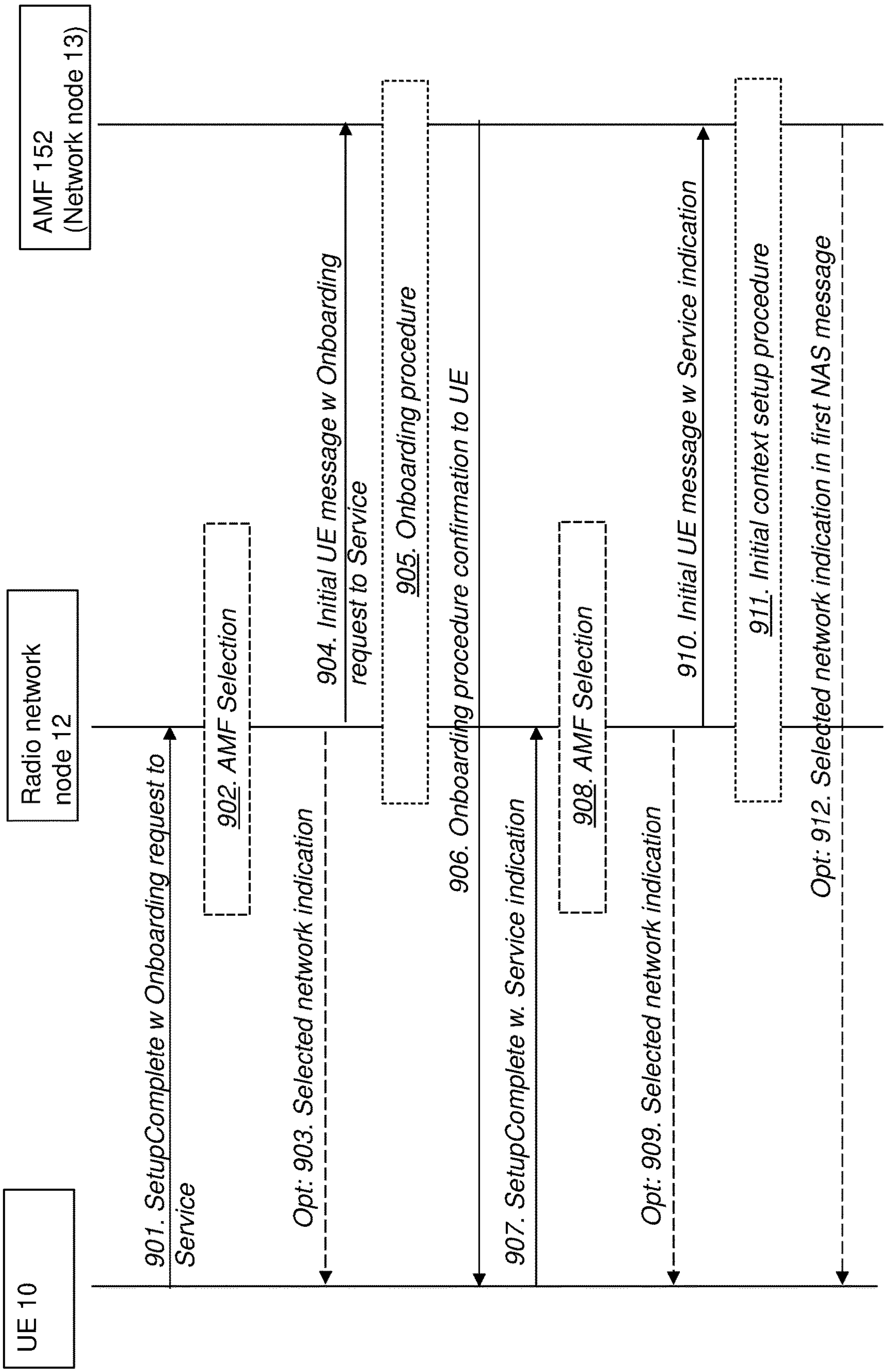
FIG. 9 shows a schematic overview depicting a service selection at the UE according to embodiments herein.

If performed as an onboarding procedure, the signalling between the UE 10 and the radio network node 12 may be according to the FIG. 9.

The example scenario of FIG. 9 may be applicable for situations when the onboarding to the service may be performed through a different network than what the service actually will be delivered through. This means that in these scenarios, the onboarding will be done through one AMF whereas a selection of a new AMF may be done for the request for connectivity to and delivery of the actual service.

Action 901. The UE 10 may send a SetupComplete with an Onboarding request to a Service.

Action 902. The radio network node 12 may, based on the above-described rules for a selected service information, and potentially additional information from the UE received in the setupComplete message or through other means, select the AMF 152 to forward the Onboarding request to.

Action 903. The radio network node 12 may let the UE 10 know immediately what network that has been selected, before or in combination with forwarding an initial UE message including the Onboarding request to Service. This is illustrated by the dashed line between the radio network node 12 and the UE 10 after AMF selection. This information may be sent to the UE in association to the initial UE message to the AMF, see Action 904. The AMF 152 and the radio network node 12 may then initiate an onboarding procedure, action 905.

Action 906. The AMF 152 may then transmit an onboarding procedure confirmation to the UE 10.

Action 907. The UE 10 selects a service. The UE 10 may indicate a desired service in the message to the radio network node 12 (setupComplete with the service indication).

Action 908. The radio network node 12 may, for example, based on the above-described rules for a selected service information, and potentially additional information from the UE received in the setupComplete message or through other means, select an AMF 152 to forward the service request to.

Action 909. The radio network node 12 may let the UE 10 know immediately what network that has been selected, before or in combination with forwarding an initial UE message including the service indication. This is illustrated by the dashed line between the radio network node 12 and the UE 10 after AMF selection. This information may be sent to the UE in association to the initial UE message to the AMF, see Action 910. The AMF and the radio network node 12 may then initiate a context setup procedure, Action 911. In an alternative embodiment, the selected network indication is not sent by the radio network node to the UE 10, but rather by the AMF 152 in subsequent signalling, Action 912. In this case, the selection of network is formally done by the AMF, not by the radio network node 12. The radio network node 12 is then only selecting an AMF based on the service indication from the UE.

Figure 10:
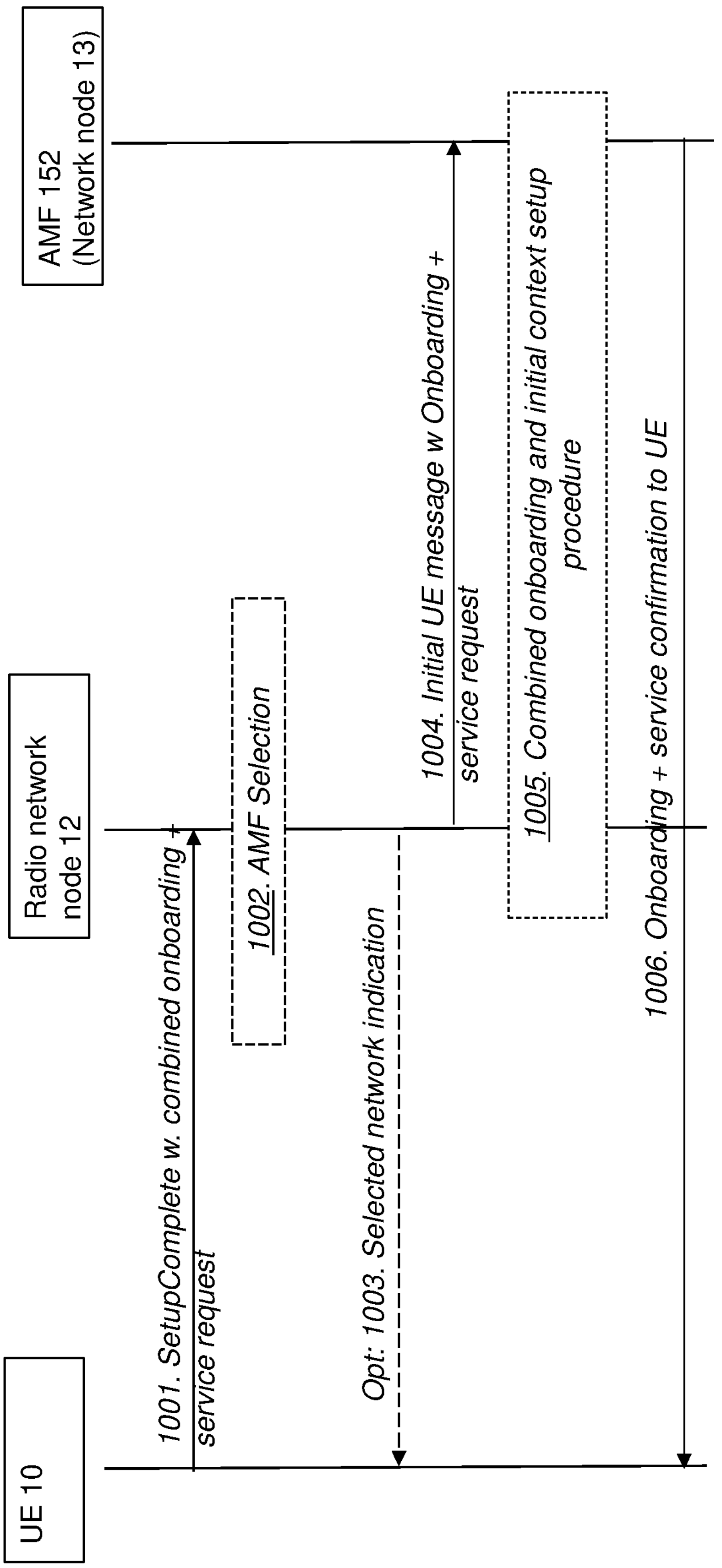
FIG. 10 shows a schematic overview depicting a service selection at the UE according to embodiments herein.

Additionally or alternatively, the onboarding procedure and the service request are combined procedures, as illustrated in FIG. 10.

Action 1001. The UE 10 may send a SetupComplete with a combined onboarding and service request.

Action 1002. The radio network node 12 may, for example, based on the above-described rules for a selected service information, and potentially additional information from the UE received in the setupComplete message or through other means, select an AMF 152 to forward the combined onboarding request and service request to.

Action 1003. The radio network node 12 may let the UE 10 know immediately what network that has been selected, before or in combination with forwarding an initial UE message including the combined onboarding request and service request. This is illustrated by the dashed line between the radio network node 12 and the UE 10 after AMF selection. This information may be sent to the UE in association to the initial UE message with the onboarding and service request to the AMF 152, see Action 1004. The AMF 152 and the radio network node 12 may then initiate combined onboarding and initial context setup procedure, action 1005.

Action 1006. The AMF 152 may then transmit a combined onboarding and service confirmation to the UE 10.

Figure 11:
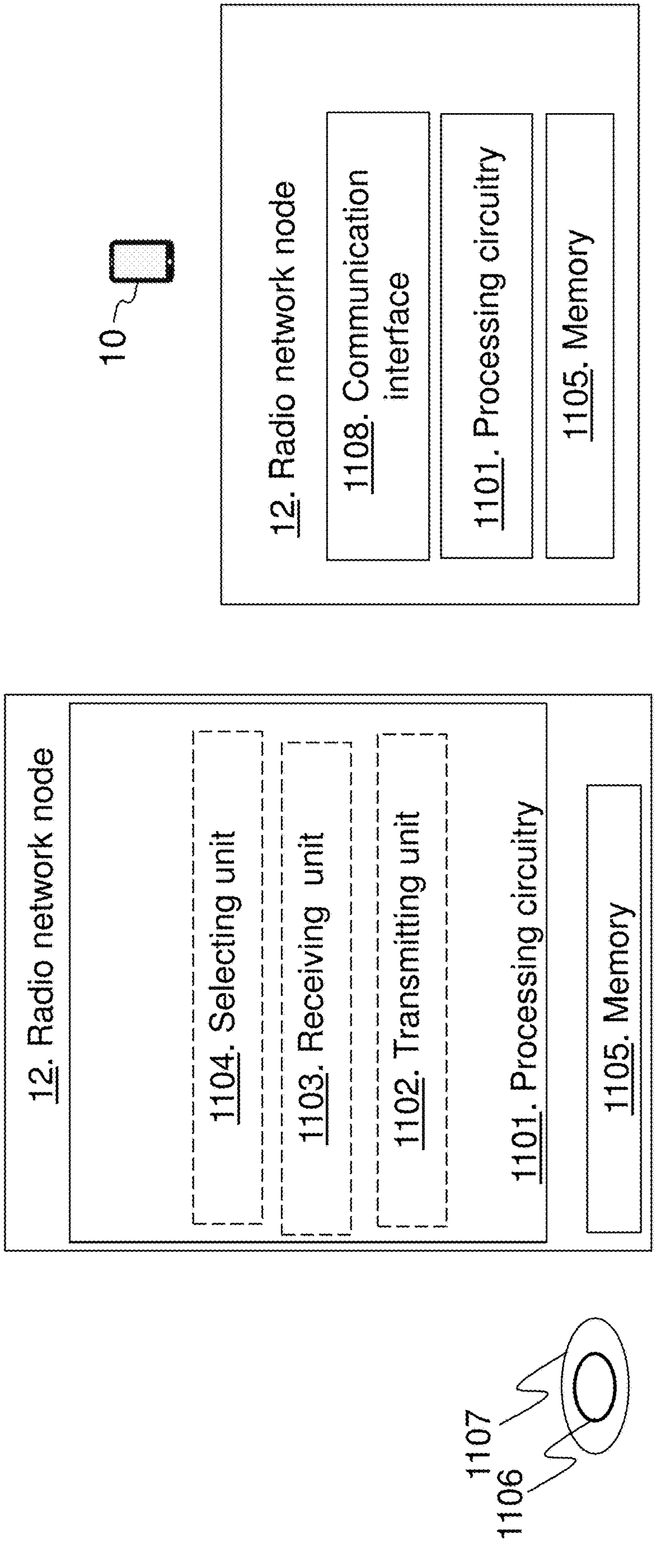
FIG. 11 shows a block diagram depicting a radio network nodes according to embodiments herein.

FIG. 11 is a block diagram depicting the radio network node 12 for handling communication (or services) in the wireless communications network 1 according to embodiments herein.

The radio network node 12 may comprise processing circuitry 1101, e.g. one or more processors, configured to perform the methods herein.

The radio network node 12 may comprise a transmitting unit 1102, e.g. a transmitter or a transceiver. The radio network node 12, the processing circuitry 1101 and/or the transmitting unit 1102 may be configured to transmit or broadcast the SI, wherein the SI comprises at least one service indication such as a service ID indicating a type of service offered by one or more networks. The radio network node 12 may be configured with the mapping of service indications and networks providing the respective service.

The radio network node 12 may comprise a receiving unit 1103, e.g. a receiver or a transceiver. The radio network node 12, the processing circuitry 1101 and/or the receiving unit 1103 is configured to receive, from the UE 10, the indication indicating selection of the service associated with the service indication out of at least one service indication. The indication may be the service ID, an index of the service ID or a GID. The indication may be received in an access request. The radio network node 12, the processing circuitry 1101 and/or the receiving unit 1103 may further be configured to receive additional information (or the information indication indicating additional information) from the UE 10, wherein the additional information comprises one or more of the following: a desired quality or quality range, a cost or cost range, or available credentials that the UE may already have, desired means of monetary transaction to acquire new necessary credentials, and desired time-of-service.

The radio network node 12 may comprise a selecting unit 1104. The radio network node 12, the processing circuitry 601 and/or the selecting unit 1104 is configured to, based on the received indication, select the network node such as an AMF that supports the service indicated by the indication. The radio network node 12, the processing circuitry 1101 and/or the selecting unit 1104 may be configured to, when selecting the network node, in addition to the service indicated by the indication, also take into consideration the additional information. The selected network node may represent one of several networks that supports the service indicated by the indication, wherein the selected network node is one out of more than one network node that is selectable for the service. The selection of the network node may follow one or more prioritization rules in the network node for said service.

The radio network node 12, the processing circuitry 1101 and/or the transmitting unit 1102 may be configured to transmit the initial message to the selected network node 13.

The radio network node 12, the processing circuitry 1101 and/or the receiving unit 1103 may further be configured to receive the response from the network node 13 indicating a selected network.

The radio network node 12, the processing circuitry 1101 and/or the transmitting unit 1102 may be configured to forward the network indication of the selected network to the UE 10.

The radio network node 12 may comprise a memory 1105. The memory 1105 comprises one or more units to be used to store data on, such as data packets, mapping, name indication, Service IDs, type indication, GIDs, networks, mobility events, measurements, sizes related to types of data transmissions, events and applications to perform the methods disclosed herein when being executed, and similar. Furthermore, the radio network node 12 may comprise a communication interface 1108 such as comprising a transmitter, a receiver, a transceiver and/or one or more antennas.

The methods according to the embodiments described herein for the radio network node 12 are respectively implemented by means of e.g. a computer program product 1106 or a computer program, comprising instructions, i.e., software code portions, which, when executed on at least one processor, cause the at least one processor to carry out the actions described herein, as performed by the radio network node 12. The computer program product 1106 may be stored on a computer-readable storage medium 1107, e.g. a disc, a universal serial bus (USB) stick or similar. The computer-readable storage medium 1107, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

Figure 12:
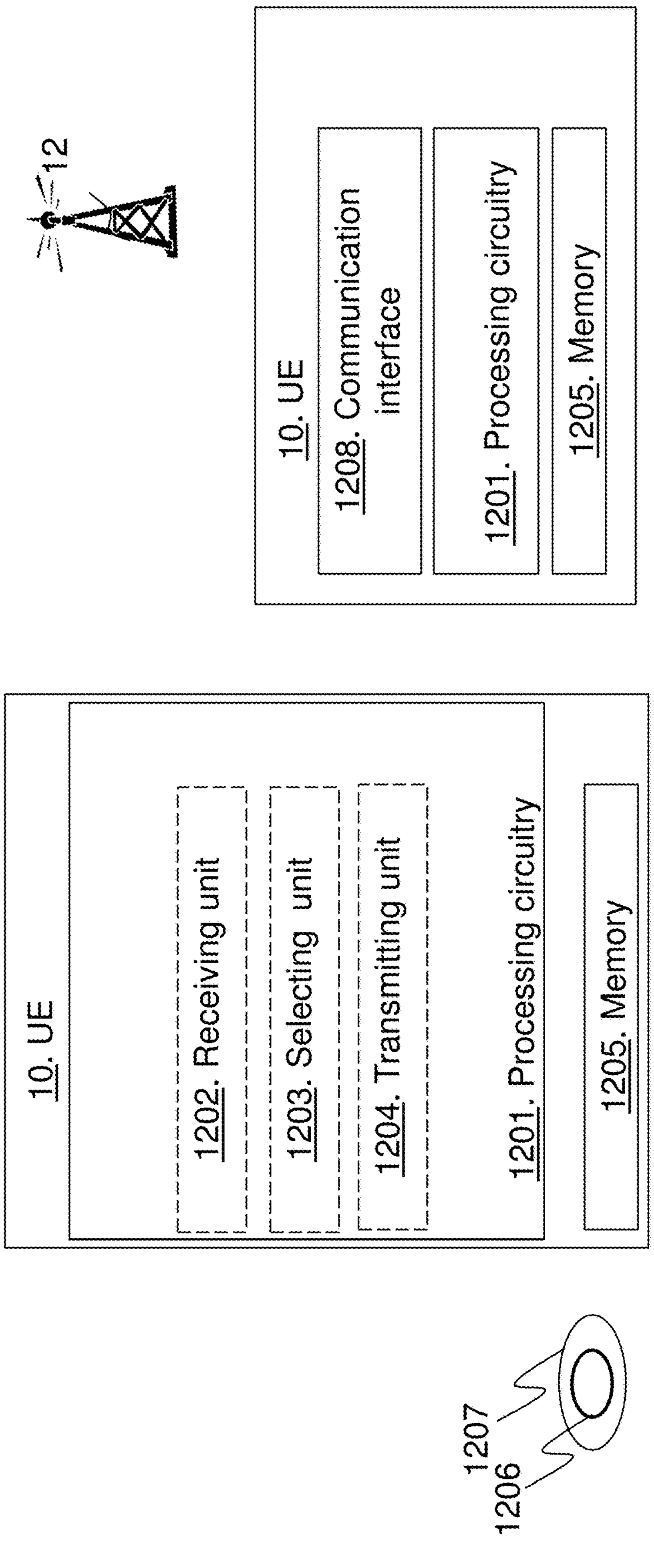
FIG. 12 shows a block diagram depicting a UE according to embodiments herein.

FIG. 12 is a block diagram depicting the UE 10 for handling communication or services in the wireless communications network 1 according to embodiments herein.

The UE 10 may comprise processing circuitry 1201, e.g. one or more processors, configured to perform the methods herein.

The UE 10 may comprise a receiving unit 1202, e.g. a reader, a receiver or a transceiver. The UE 10, the processing circuitry 1201 and/or the receiving unit 1202 is configured to detect at least one service indication in the SI, broadcast from the radio network node. The UE 10, the processing circuitry 1201 and/or the receiving unit 1202 may be configured to read the at least one service indication such as service ID in the SI broadcast from the radio network node 12. The UE may be configured with the mapping, wherein the mapping maps one or more service indications to a respective service.

The UE 10 may comprise a selecting unit 1203. The UE 10, the processing circuitry 1201 and/or the selecting unit 1203 is configured to select the service indication out of the at least one service indication from the SI broadcast to represent the service the UE targets association with. For example, the UE 10, the processing circuitry 1201 and/or the selecting unit 1203 may be configured to select, based on the UE preference, the service indication out of the at least one service indication from SI broadcast to represent a service the UE targets association with (i.e. the service the UE wants to use). The UE 10, the processing circuitry 1201 and/or the selecting unit 1203 may be configured to select the service indication based on the UE preference. The UE preference may be based on received additional information from the radio network node (12

The UE 10 may comprise a transmitting unit 1204, e.g. a transmitter or a transceiver. The UE 10, the processing circuitry 1201 and/or the transmitting unit 1204 is configured to transmit the indication indicating the selection of the service associated with said service indication. The indication may be the service ID, the index of the service ID, or a GID. The indication may be transmitted in an access request.

The UE 10, the processing circuitry 1201 and/or the receiving unit 1202 may be configured to receive from the radio network node 12 the network indication of the selected network. The UE 10, and/or the processing circuitry may be configured to access the selected network based on the network indication and use the service The UE 10 may comprise a memory 1205. The memory 1205 comprises one or more units to be used to store data on, such as data packets, grants, name indication(s), type indication(s), indices, bitmap, service IDs, indications, GIDs, mobility events, measurements, events and applications to perform the methods disclosed herein when being executed, and similar. Furthermore, the UE 10 may comprise a communication interface 1208 such as comprising a transmitter, a receiver, a transceiver and/or one or more antennas.

The methods according to the embodiments described herein for the UE 10 are respectively implemented by means of e.g. a computer program product 1206 or a computer program, comprising instructions, i.e., software code portions, which, when executed on at least one processor, cause the at least one processor to carry out the actions described herein, as performed by the UE 10. The computer program product 1206 may be stored on a computer-readable storage medium 1207, e.g. a disc, a universal serial bus (USB) stick or similar. The computer-readable storage medium 1207, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 13:
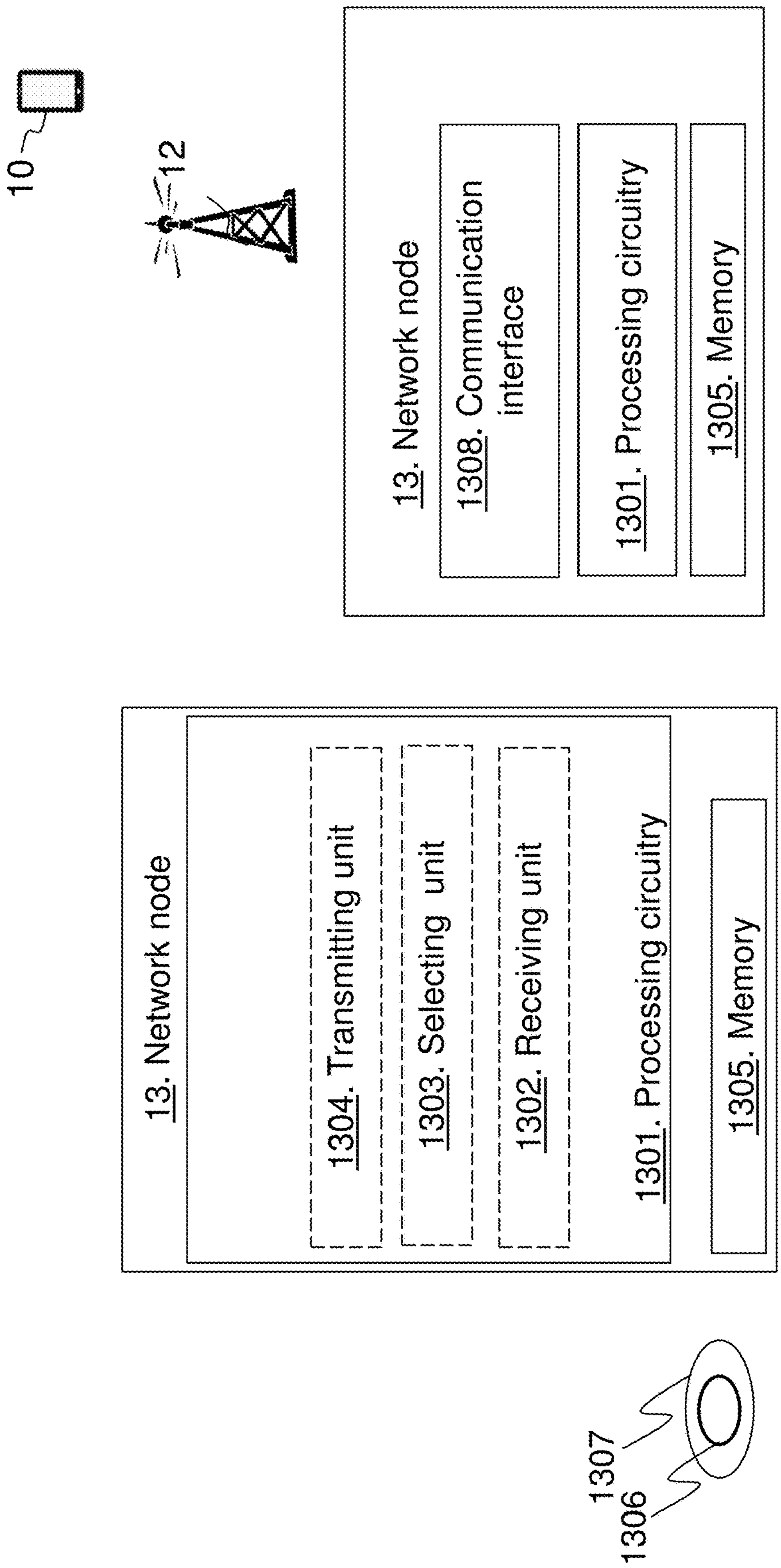
FIG. 13 shows a block diagram depicting a network node according to embodiments herein.

FIG. 13 is a block diagram depicting the network node 13 for handling communication (or services) in the wireless communications network 1 according to embodiments herein.

The network node 13 may comprise processing circuitry 1301, e.g. one or more processors, configured to perform the methods herein.

The network node 13 may comprise a receiving unit 1302, e.g. a receiver or a transceiver. The network node 13, the processing circuitry 1301 and/or the receiving unit 1302 is configured to receive from the radio network node 12 the initial message with the service request. The service request may indicate a service indication and a UE requesting the service.

The network node 13 may comprise a selecting unit 1303. The network node 13, the processing circuitry 1301 and/or the selecting unit 1303 is configured to select the network for providing the requested service.

The network node 13 may comprise a transmitting unit 1304, e.g. a transmitter or a transceiver. The network node 13, the processing circuitry 1301 and/or the transmitting unit 1304 is configured to respond to the radio network node 12 with an indication of the selected network.

The network node 13 may comprise a memory 1305. The memory 1305 comprises one or more units to be used to store data on, such as data packets, mapping, name indication, network indications, network information, Service IDs, type indication, GIDs, networks, mobility events, measurements, sizes related to types of data transmissions, events and applications to perform the methods disclosed herein when being executed, and similar. Furthermore, the network node 13 may comprise a communication interface 1308 such as comprising a transmitter, a receiver, and/or a transceiver.

The methods according to the embodiments described herein for the network node 13 are respectively implemented by means of e.g. a computer program product 1306 or a computer program, comprising instructions, i.e., software code portions, which, when executed on at least one processor, cause the at least one processor to carry out the actions described herein, as performed by the network node 13. The computer program product 1306 may be stored on a computer-readable storage medium 1307, e.g. a disc, a universal serial bus (USB) stick or similar. The computer-readable storage medium 1307, having stored thereon the computer program product, may comprise the instructions which, when executed on at least one processor, cause the at least one processor to carry out the actions described herein, as performed by the network node 13. In some embodiments, the computer-readable storage medium may be a transitory or a non-transitory computer-readable storage medium. Thus, embodiments herein may disclose a network node 13 for handling communication in a wireless communications network, wherein the network node 13 comprises processing circuitry and a memory, said memory comprising instructions executable by said processing circuitry whereby said network node 13 is operative to perform any of the methods herein.

In some embodiments a more general term "radio network node" is used and may correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
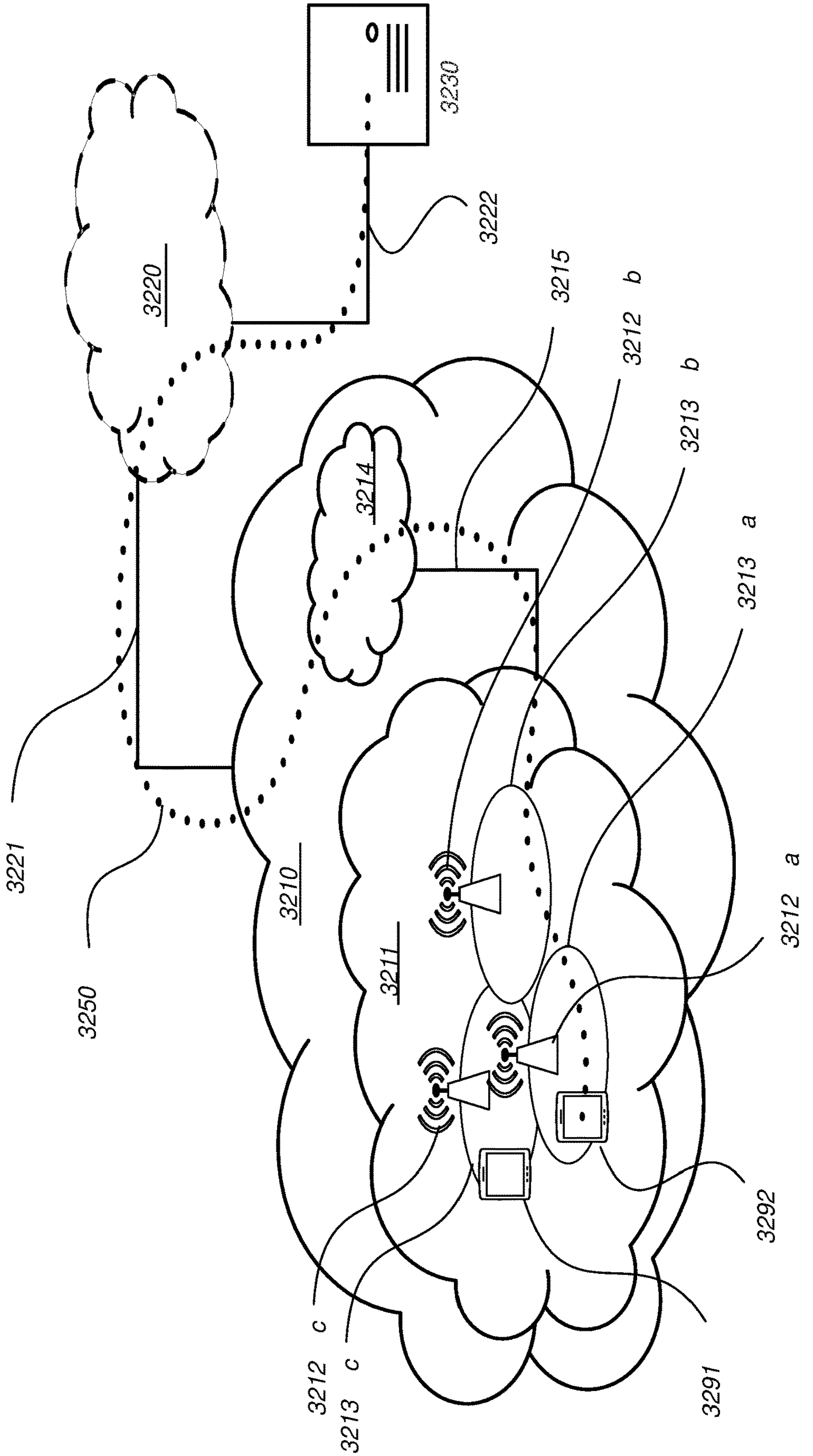
FIG. 14 schematically illustrates a telecommunication network connected via an intermediate network to a host computer.

With reference to FIG. 14, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10 and relay UE 13, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
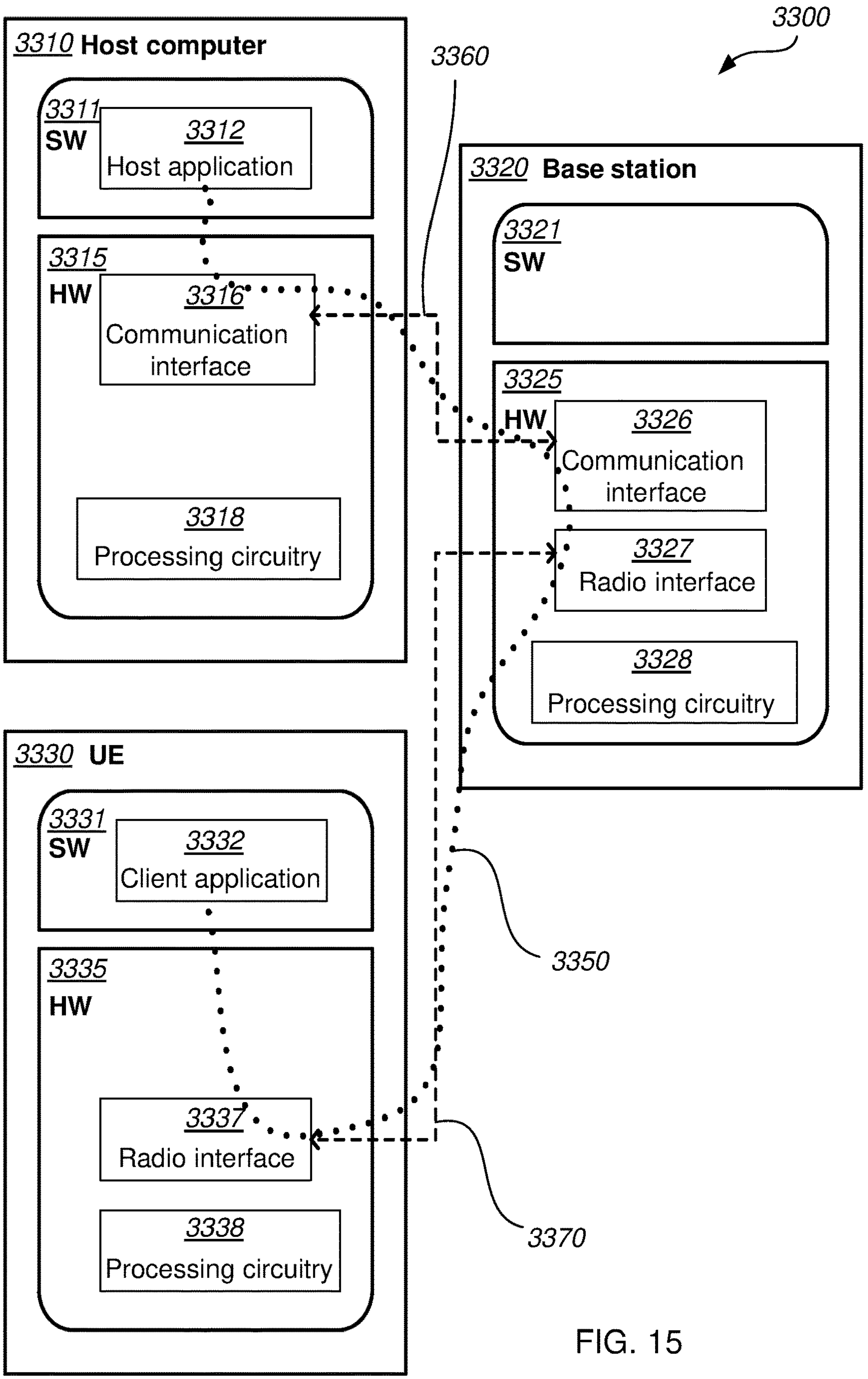
FIG. 15 is a generalized block diagram of a host computer communicating via a base station with a user equipment over a partially wireless connection.

It is noted that the host computer 3310, base station 3320 and UE 3330 illustrated in FIG. 15 may be identical to the host computer 3230, one of the base stations 3212*a*, 3212*b*, 3212*c* and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since service and not the network is selected by the UE and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 16:
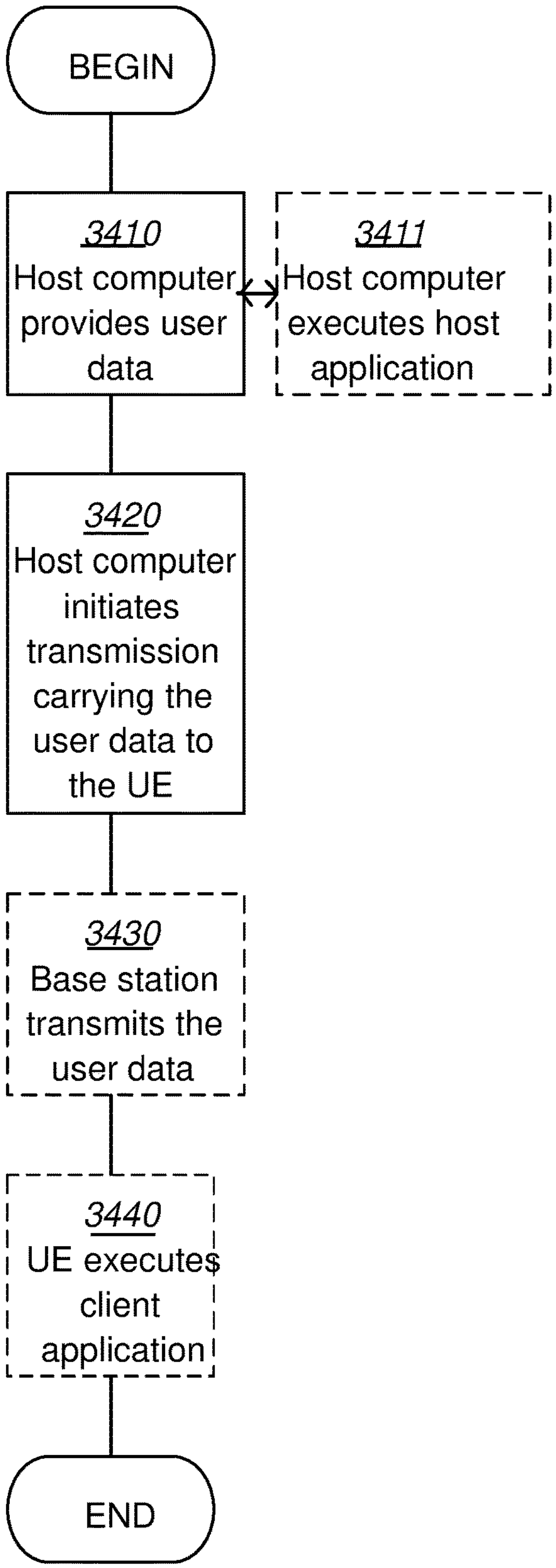
FIGS. 16-19 are flowcharts illustrating methods implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 17:
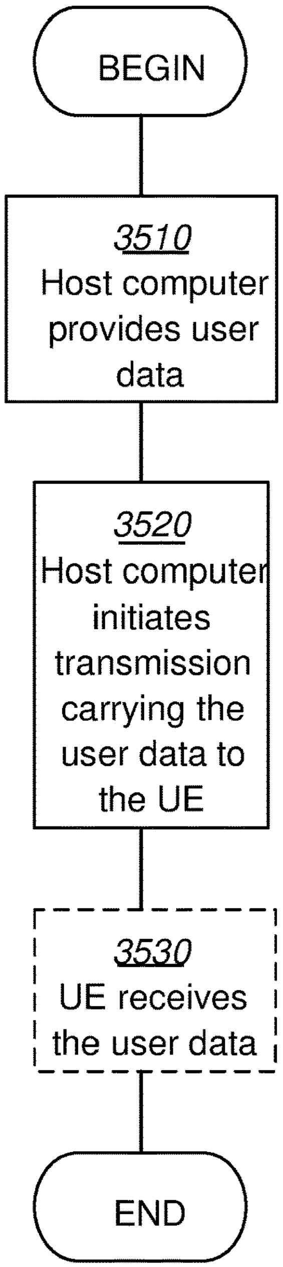

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 18:
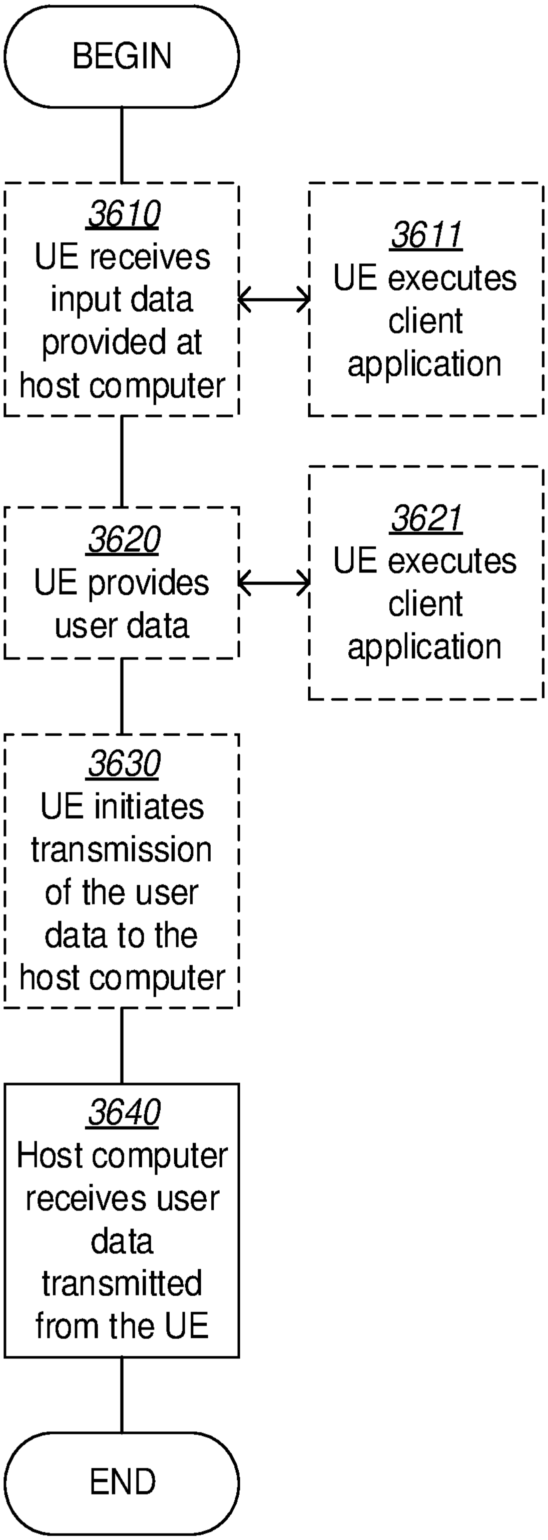

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 19:
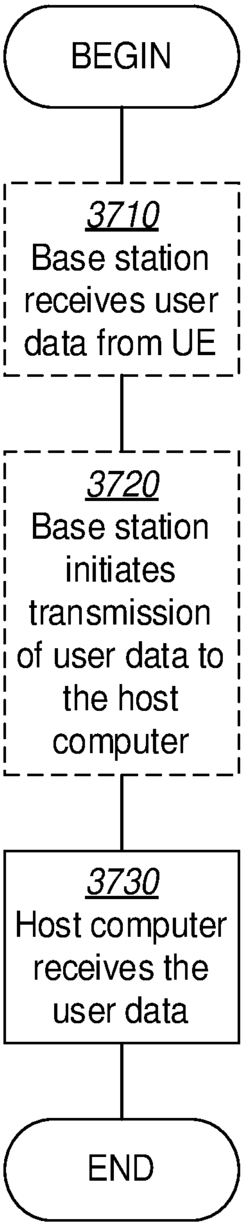

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
|---|---|
| 5GC | 5th Generation Core Network |
| BSR | Buffer Status Report |
| CORESET | Control Resource Set |
| CN | Core Network |
| CSS | Common Search Space |
| DCI | Downlink Control Indicator |
| DVT | Data Volume Threshold |
| EDT | Early Data Transmission |
| MIB | Master Information Block |
| Msg | Message |
| NR | New Radio |
| PBCH | Physical Broadcast Channel |
| PDCCH | Physical Downlink Control Channel |
| PDSCH | Physical Downlink Shared Channel |
| PRACH | Physical Random Access Channel |
| RACH | Random Access Channel |
| RAR | Random Access Response |
| SDT | Small Data Transmission |
| SSB | Synchronization Signal Block |

The invention claimed is:

1. A method performed by a radio network node for handling services in a wireless communications network, the method comprising:

receiving, from a user equipment (UE), an indication indicating selection of a service associated with a service indication out of at least one service indication and an information indication indicating additional information comprising one or more of:

a desired quality or quality range, a cost or cost range, available credentials that the UE has, desired means of monetary transaction to acquire new necessary credentials, and desired time-of-service; and based on the received indication, selecting a network node that supports the service indicated by the indication.

2. The method according to claim 1, wherein the radio network node is configured with a mapping of service indications and networks providing a respective service.

3. The method according to claim 1, further comprising:

transmitting system information (SI), wherein the SI comprises at least one service indication indicating a type of service offered by one or more networks.

4. The method according to claim 1, wherein the indication is a service identity (ID), an index of the service ID, or a Group ID (GID).

5. The method according to claim 1, wherein the indication is received in an access request.

6. The method according to claim 1, wherein selecting the network node, in addition to the service indicated by the indication also takes into consideration the additional information.

7. A method performed by a user equipment (UE) for handling services in a wireless communications network, the method comprising:

detecting at least one service indication in a system information (SI) broadcast from a radio network node;

selecting a service indication out of the at least one service indication from the SI broadcast to represent a service the UE targets association with; and transmitting an indication indicating a selection of the service associated with the service indication and an information indication indicating additional information comprising one or more of:

a desired quality or quality range, a cost or cost range, available credentials that the UE has, desired means of monetary transaction to acquire new necessary credentials, and desired time-of-service.

8. The method according to claim 7, wherein the UE is configured with a mapping, wherein the mapping maps one or more service indications to a respective service.

9. The method according to claim 7, wherein selecting the service indication is further based on a UE preference.

10. The method according to claim 9, wherein the UE preference is based on received additional information from the radio network node.

11. The method according to claim 7, further comprising:

receiving from the radio network node a network indication of a selected network; and accessing the selected network based on the network indication and using the service.

12. A radio network node for handling services in a wireless communications network, wherein the radio network node is configured to:

receive, from a user equipment (UE), an indication indicating selection of a service associated with a service indication out of at least one service indication and an information indication indicating additional information comprising one or more of:

a desired quality or quality range, a cost or cost range, available credentials that the UE has, desired means of monetary transaction to acquire new necessary credentials, and desired time-of-service; and based on the received indication, select a network node that supports the service indicated by the indication.

13. The radio network node according to claim 12, wherein the radio network node is configured with a mapping of service indications and networks providing a respective service.

14. The radio network node according to claim 12, wherein the radio network node is further configured to:

transmit system information (SI), wherein the SI comprises at least one service indication indicating a type of service offered by one or more networks.

15. The radio network node according to claim 12, wherein the indication is a service identity (ID), an index of the service ID, or a Group ID (GID).

16. The radio network node according to claim 12, wherein the indication is received in an access request.

17. The radio network node according to claim 12, wherein the radio network node is configured to select the network node by taking, in addition to the service indicated by the indication, also the additional information into consideration.

18. A user equipment (UE), for handling services in a wireless communications network, wherein the UE is configured to:

detect at least one service indication in a system information (SI) broadcast from a radio network node;

select a service indication out of the at least one service indication from the SI broadcast to represent a service the UE targets association with; and transmit an indication indicating a selection of the service associated with the service indication and an information indication indicating additional information comprising one or more of:

a desired quality or quality range, a cost or cost range, available credentials that the UE has, desired means of monetary transaction to acquire new necessary credentials, and desired time-of-service.

* * * * *